United States Patent
Murray et al.

(10) Patent No.: US 8,698,798 B2
(45) Date of Patent: *Apr. 15, 2014

(54) VISUALIZATION OF IMAGES ON USER-DEFINED FOLDED STRUCTURES IN A THREE-DIMENSIONAL SUBSURFACE ENVIRONMENT

(71) Applicant: Landmark Graphics Corporation, Houston, TX (US)

(72) Inventors: Donald J. Murray, Golden, CO (US); Stuart L. Smith, Englewood, CO (US)

(73) Assignee: Landmark Graphics Corporation, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/663,530

(22) Filed: Oct. 30, 2012

(65) Prior Publication Data

US 2013/0055149 A1 Feb. 28, 2013

Related U.S. Application Data

(63) Continuation of application No. 12/397,416, filed on Mar. 4, 2009, now Pat. No. 8,325,179.

(51) Int. Cl.
*G06T 19/00* (2011.01)
*G06T 15/20* (2011.01)

(52) U.S. Cl.
USPC .......................................... 345/419; 345/427

(58) Field of Classification Search
None
See application file for complete search history.

(56) References Cited

U.S. PATENT DOCUMENTS

| | | | |
|---|---|---|---|
| 6,545,680 B1 | 4/2003 | Delas et al. | |
| 2005/0168461 A1 | 8/2005 | Acosta et al. | |
| 2008/0162407 A1 | 7/2008 | Bolton et al. | |
| 2008/0165186 A1 | 7/2008 | Lin | |

FOREIGN PATENT DOCUMENTS

| | | |
|---|---|---|
| CN | 1461458 A | 12/2003 |
| CN | 1975784 A | 6/2007 |
| CN | 101308583 A | 11/2008 |
| EP | 1696388 | 10/2000 |
| WO | WO 02/37422 A1 | 5/2002 |
| WO | 2004049265 | 6/2004 |

OTHER PUBLICATIONS

"Manifolds in 3D Views"; MicroImages, Inc.; May 2004; 2 pages.

(Continued)

*Primary Examiner* — Kee M Tung
*Assistant Examiner* — Sing-Wai Wu
(74) *Attorney, Agent, or Firm* — Meyertons Hood Kivlin Kowert & Goetzel, P.C.; Bradley A. Misley; Mark K. Brightwell

(57) ABSTRACT

A system and method for visualizing images in a three-dimensional context. The method involves receiving user input specifying a polyline in a given cartographic reference system. The polyline is displayed in a 2D window. A set of geometry data is generated based on the polyline and a user-specified vertical range. The geometry data set represents a folded object in three-dimensional space, where the folded object has one fold for each knee point in the polyline. A 3D virtual world is rendered to obtain a rendered image. The rendering action includes rendering the geometry data set using a given image as texture. The rendered image is displayed in a 3D window, where the displayed rendered image visually represents the given image as being painted onto the folded object in the three-dimensional space.

23 Claims, 23 Drawing Sheets

(56) References Cited

OTHER PUBLICATIONS

"GeoTIFF"; Wikipedia; http://en.wikipedia.org/wiki/GeoTIFF; Last modified on May 13, 2009.
"GeoTIFF"; Trac; http://trac.osgeo.org/geotiff/; Dec. 28, 2000.
"Georeference"; Wikipedia; http://en.wikipedia.org/wiki/Georeference; Last modified on May 19, 2009.
International Search Report and Written Opinion for Application No. PCT/US2010/026193, mailed Jun. 24, 2010; 14 pages.
Laurent Castanié, Bruno Lévy, and Fabien Bosquet; "VoumeExplorer: Roaming Large Volumes To Couple Visualization and Data Processing for Oil and Gas Exploration"; Proceedings of the IEEE Visualization Oct. 23-28, 2005, Minneapolis, MN; 8 pages.
Paul Holden, "VoxelGeo 1.1 Productivity Tool for the Geosciences, User's Guide", Revised Mar. 1994.

VISUALIZATION OF IMAGES ON USER-DEFINED FOLDED STRUCTURES IN A THREE-DIMENSIONAL SUBSURFACE ENVIRONMENT

RELATED APPLICATION DATA

This application is a continuation of U.S. patent application Ser. No. 12/397,416, filed on Mar. 4, 2009, entitled "Three-Dimensional Visualization of Images in the Earth's Subsurface", invented by Donald J. Murray and Stuart L. Smith, which is hereby incorporated by reference in its entirety as though fully and completely set forth herein.

FIELD OF THE INVENTION

The present invention generally relates to the field of computer graphics, and more particularly, to a system, method and memory medium for visualizing images in a three-dimensional context.

DESCRIPTION OF THE RELATED ART

The art of computer graphics has developed to the point where complex three-dimensional scenes can be created and visualized using software tools. However, for geoscientists and those interested in exploring the earth's subsurface for features of interest or economic value, such tools may be difficult to use. Thus, there exists a need for tools more particularly suited to the visualization of the earth's subsurface.

SUMMARY

In one set of embodiments, a method for visualizing one or more images in a three-dimensional (3D) environment may include the following operations.

The method may include displaying a 2D map window using a display system. The 2D map window represents a given portion of the earth's surface according to a given cartographic reference system (or map projection system). The cartographic reference system being used may be determined by user selection. Similarly, the portion of the earth's surface that is being displayed may be determined by user selection.

The method may also include receiving user input specifying a plurality (or sequence) of points in the 2D map window. The plurality of points defines a polyline. Thus, the plurality of points includes two end points and zero or more knee points. Alternatively, the user may specify the plurality of points by means other than specifying them in the 2D map window. For example, the user may specify the points by entering their coordinate values via an input dialog, or simply by identifying a previously generated list of points stored in memory.

The method may also include receiving user input specifying a vertical range in a vertical dimension. The vertical dimension may be interpreted as extending perpendicular to the given portion of the earth's surface.

The method may also include receiving user input identifying an image that is stored in a memory. The content of the image and the means of producing the image are not constrained by the present invention. Furthermore, image is not limited to a specific file format.

The method may also include generating a set of geometry data based on the polyline and the vertical range, where the geometry data set represents a folded rectangle in three-dimensional space. The folded rectangle has one fold for each knee point in the polyline. In the case where the polyline has no knee points, the folded rectangle is simply a rectangle with no folds.

The 2D map window may represent a horizontal plane of projection. Thus, the polyline may be interpreted geometrically as the projection of the folded plane onto the horizontal plane. Similarly, the vertical range may be interpreted geometrically as the projection of the folded plane onto the vertical dimension.

The method may also include adding the geometry data set to a 3D virtual world (e.g., a scene graph), and adding a copy of the image to the 3D virtual world. The operation of adding the image copy to the 3D virtual world may include specifying that the image copy is to be applied as texture to the geometry data set. (The 3D virtual world is a data structure that contains data objects used to define the 3D environment.)

The method may also include rendering the 3D virtual world to obtain a rendered image. The action of rendering the 3D virtual world includes rendering the geometry data set using the image copy as texture.

The method may also include displaying the rendered image in a 3D window using the display system. When displayed, the rendered image visually represents (depicts) the image as being painted onto the folded rectangle in the three-dimensional space.

In various embodiments, the method may also allow the user to add additional image-painted folded rectangles to the three-dimensional space. The image-painted folded rectangles may have any desired configurations in the three-dimensional space. For example, they may freely intersect each other.

In various embodiments, the method may also allow the user to "move around" (navigate) in the 3D world.

In some embodiments, the 3D virtual world may include one or more other types of graphical object. Thus, the rendered image obtained by the rendering action may include visual representation of the other types of graphical objects. For example, the 3D virtual world may include: objects representing one or more reservoir models; objects representing one or more subsurface horizons; objects representing one or more seismic profiles; objects representing the three-dimensional trajectory of wells in the earth's subsurface; or any combination thereof.

In some embodiments, a computer-accessible memory medium that stores program instructions is contemplated. The program instructions are executable by a computer system to implement a method, e.g., any of the method embodiments described herein, or, any combination of the method embodiments described herein, or, any subset of any method embodiment described herein.

In some embodiments, a computer system is configured to include a processor (or a set of processors) and memory medium. The memory medium stores program instructions. The processor is configured to read and execute the program instructions. The program instructions are executable to implement a method, e.g., any of the various method embodiments described herein, or, any combination of the method embodiments described herein, or, any subset of the method embodiments described herein. The computer system may be realized in any of various forms.

Various embodiments described herein allow a user (or a set of users) to view images in a three-dimensional context, i.e., painted onto folded rectangles arranged in a three-dimensional space. This viewing capability may allow the user to make more informed interpretations and decisions regarding features and/or structures in the images. For example, a user may use the visualizations described herein to make decisions regarding where to drill a set of one or more wells, where to perforate a well, how many wells to drill in a given reservoir; to estimate a production capacity of a reservoir; to estimate the cost or difficulty of exploiting a given deposit of a substance such as oil, gas, ore or coal; etc.

Figure 1A:
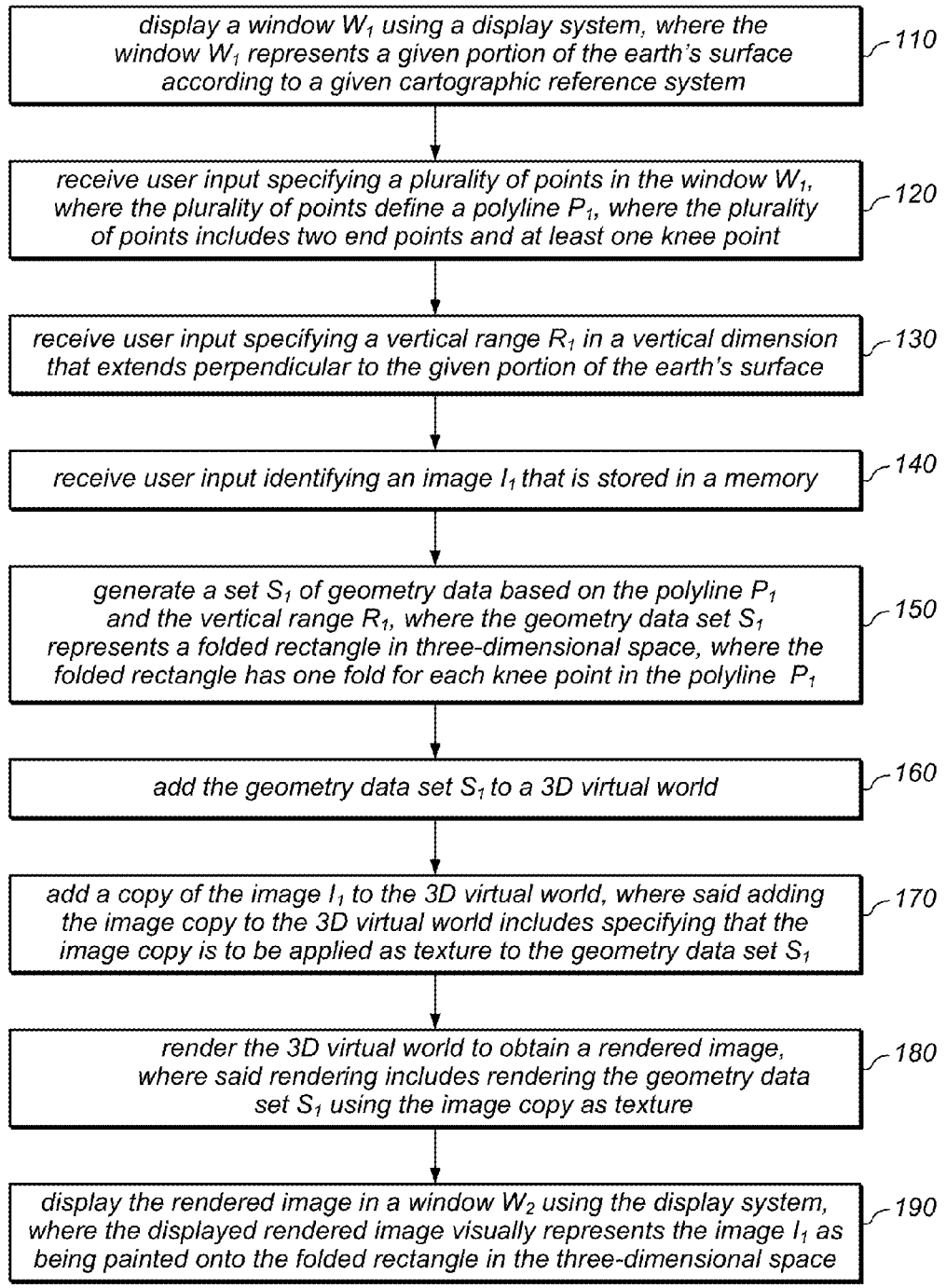
FIG. 1A illustrates one embodiment of a method for visualizing an image in a 3D context.

While the invention is susceptible to various modifications and alternative forms, specific embodiments thereof are shown by way of example in the drawings and are herein described in detail. It should be understood, however, that the drawings and detailed description thereto are not intended to limit the invention to the particular forms disclosed, but on the contrary, the intention is to cover all modifications, equivalents and alternatives falling within the spirit and scope of the present invention as defined by the appended claims.

DETAILED DESCRIPTION OF THE EMBODIMENTS

The present invention may be realized in any of various forms. For example, in some embodiments, the present invention may be realized as a computer-implemented method, a computer-accessible memory medium, or a computer system. In other embodiments, the present invention may be realized using one or more custom designed hardware devices such as ASICs or FPGA's.

A memory medium is a medium configured for the storage and retrieval of information. Examples of memory media include: various kinds of semiconductor memory such as RAM and ROM; various kinds of magnetic media such as magnetic disk, tape, strip, and film; various kinds of optical media such as CD-ROM and DVD-ROM; various media based on the storage of electrical charge and/or other physical quantities; media fabricated using various lithographic techniques; etc.

A computer-accessible memory medium is a memory medium that stores program instructions and/or data, where the program instructions are executable by a computer system to implement a method, e.g., any of a method embodiments described herein, or, any combination of the method embodiments described herein, or, any subset of any of the method embodiments described herein.

In some embodiments, a computer system may be configured to include a processor (or a set of processors) and a memory medium. The memory medium stores program instructions. The processor is configured to read and execute the program instructions. The program instructions are executable to implement any of the various method embodiments described herein (or, any combination of the method embodiments described herein, or, any subset of any of the method embodiments described herein). The computer system may be realized in any of various forms. For example, the computer system may be a personal computer (in any of its various realizations), a workstation, a computer on a card, a server computer, a client computer, a hand-held device, etc.

In some embodiments, a set of computers distributed through a network may be configured to partition the effort of executing a computational method (e.g., any of the method embodiments disclosed herein).

In one embodiment, a computer-implemented method 100 for visualizing one or more images in a three-dimensional (3D) environment may involve the following operations which are described in connection with FIGS. 1A-1C.

At 110, a computer system (or a set of computer systems) may display a window $W_1$ using a display system. The window $W_1$ represents a given portion of the earth's surface according to a given cartographic reference system (or map projection system). The window $W_1$ may be configured to allow certain kinds of drawing input as described below. The term "window" has the full breadth of its ordinary meaning, and refers to a portion or all of a display screen for displaying content, such as an image, text, etc. A window may be a graphical user interface (GUI) element for receiving user input and/or displaying output.

As used herein the term "earth's surface" refers to the entire surface of the planet earth, including both land surface and sea/ocean/aquatic surface.

The user may choose the cartographic reference system being used from a set of supported cartographic reference systems. The set of supported reference systems may include reference systems that are of interest in the fields of oil and gas exploration. For example, in one embodiment, the following cartographic reference systems are supported: WGS 84, EPSG 4326, and any of the UTM zones.

Furthermore, the user may select the portion of the earth's surface that is being examined/visualized.

At 120, the computer system may receive user input specifying a plurality (or list) of points in the window $W_1$, where the plurality of points defines a polyline $P_1$. (A polyline is a sequence of line segments that are connected to form a path.) The plurality of points includes two end points and zero or more knee points. A knee point is an intermediate point, i.e., a point that is not one of the end points. The polyline $P_1$ illustrated in FIG. 1B has two knee points. The polyline $P_1$ shown in FIG. 1C has one knee point. In the case where the polyline includes zero knee points, the polyline is simply a line segment.

The user may specify the plurality of points by performing mouse-based manipulations in the window $W_1$, e.g., manipulations such as mouse click and drag operations.

Alternatively, the user may specify (or identify) the plurality of points by means other than specifying them in the window $W_1$. For example, in one input mode, the user may specify the plurality of points by entering the coordinates of the points in the given cartographic reference system, e.g., by means of keyboard entries in an input dialog. In another input mode, the user may identify a list of points that have already been stored in memory.

At 130, the computer system may receive user input specifying a vertical range $R_1$ in a vertical dimension that extends perpendicular to the given portion of the earth's surface. The range $R_1$ is an interval [A,B] along the vertical dimension. The user may specify the range $R_1$ by any of various means. For example, the user may mark the interval bounding values A and B by clicking on desired positions of a displayed line segment (or bar) representing the vertical dimension. As another example, the user may enter the values A and B through numeric input fields in a graphical user interface (e.g., a displayed input dialog). As yet another example, the user may enter the values A and $\delta=B-A$, i.e., a start value and interval length.

The computer system may allow the user to select the physical variable that is to be associated with the vertical dimension. For example, in one embodiment, the user may select the vertical dimension to be depth or time. The choice of depth may be useful when attempting visualize physical structure under the earth. The choice of time may be useful when visualizing data objects with a vertical component measured in two-way travel time e.g. seismic data At 140, the computer system may receive user input identifying an image $I_1$ that is stored in a memory (e.g., in the computer's RAM or on magnetic disc or a server over a network). The content of the image $I_1$ and the means of producing the image are not constrained by the present invention. Furthermore, the image is not limited any specific format. In one embodiment, any of the following image extensions may be used: JPEG="jpeg", JPG="jpg", GIF="gif", TIFF="tiff", TIF="tif", PNG="png", BMP="bmp" and PNM="pnm".

At 150, the computer system may generate a set $S_1$ of geometry data based on the polyline $P_1$ and the vertical range $R_1$, where the set $S_1$ of geometry data represents a folded rectangle $F_1$ in three-dimensional space. The folded rectangle $F_1$ has one fold for each knee point in the polyline $P_1$. In the case where the polyline $P_1$ has no knee points, the folded rectangle $F_1$ is simply a rectangle with no folds.

The window $W_2$ may represent a horizontal plane of projection. Thus, the polyline $P_1$ may be interpreted geometrically as the projection of the folded plane $F_1$ onto the horizontal plane. Similarly, the vertical range $R_1$ may be interpreted geometrically as the projection of the folded plane onto the vertical dimension.

In one embodiment, the geometry data set $S_1$ may include a triangle mesh (or a mesh of polygons). The geometry data set $S_1$ may also include a TriangleSet and/or a QuadSet.

At 160, the computer system may add the geometry data set $S_1$ to a 3D virtual world. The 3D virtual world is a data structure that contains data objects used to define a 3D environment, e.g., data objects such as sets of geometry data, textures, transformations and lights. In one embodiment, the 3D virtual world is organized as a tree structure, e.g., as a scene graph or a portion of a scene graph.

At 170, the computer system may add a copy of the image $I_1$ to the 3D virtual world. The operation of adding the image copy to the 3D virtual world may include specifying that the image copy is to be applied as texture to the geometry data set $S_1$. Thus, the image copy may be "coincident" with the geometry data $S_1$.

At 180, the computer system may render the 3D virtual world to obtain a rendered image, where the action of rendering includes rendering the geometry data set $S_1$ using the image copy as texture. In one embodiment, the computer system may include one or more graphics accelerators that are specialized for performing graphical rendering computations. The action of rendering the 3D virtual world may invoke the services of one or more graphics accelerator.

At 190, the computer system may display the rendered image in a window $W_2$ using the display system. When displayed, the rendered image visually represents (depicts) the image $I_1$ as being painted onto the folded rectangle $F_1$ in the three-dimensional space. For example, in FIG. 1B the image $I_1$ comprises a triad of stick men.

That image is painted onto the folded rectangle $F_1$ shown in window $W_2$. As another example, in FIG. 1C the image $I_1$ comprises the pattern "X Y Z". That pattern is painted onto the folded rectangle $F_1$, which in this figure has only one fold.

Figure 1B:
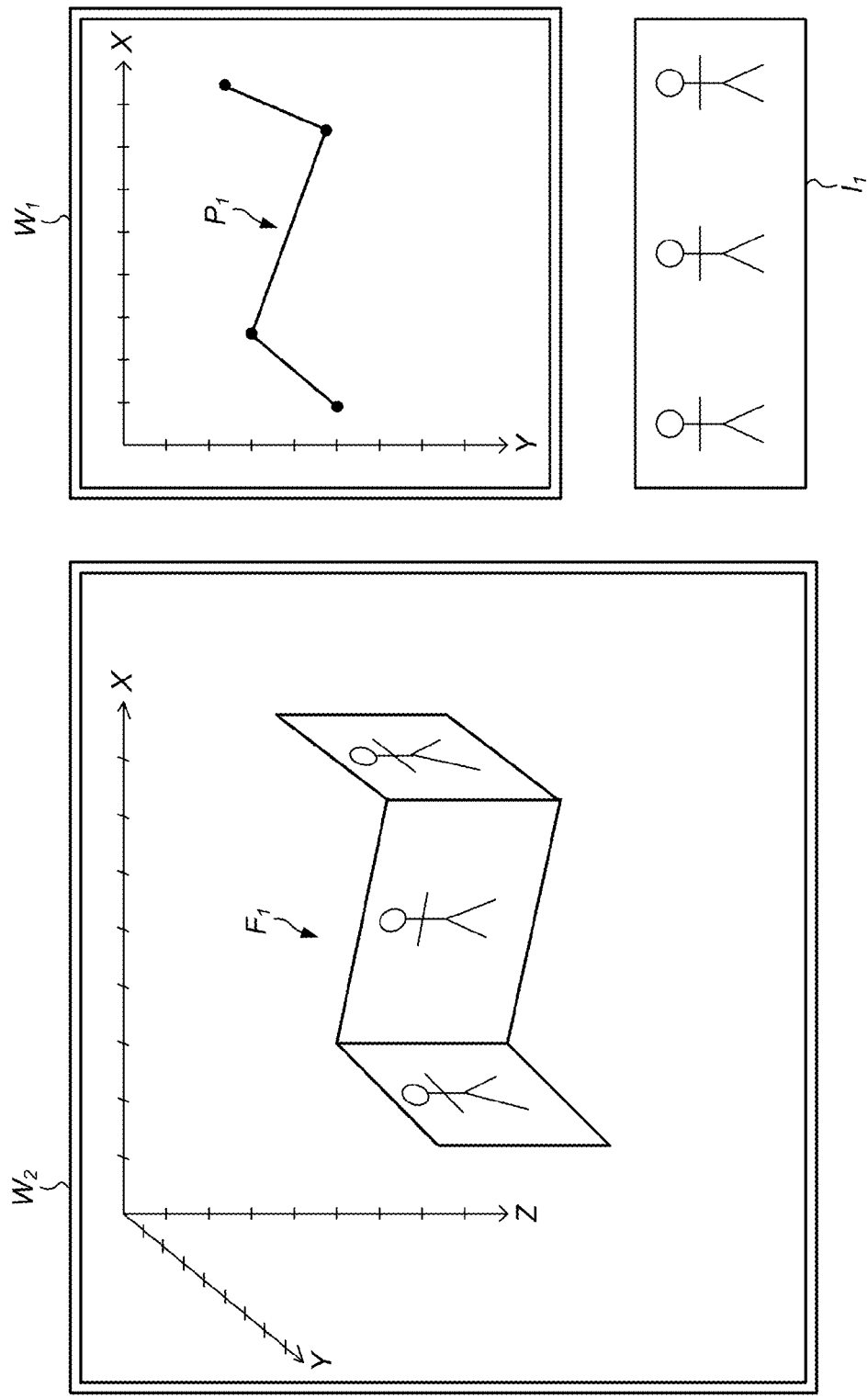
FIG. 1B illustrates one example of an image being painted onto a folded rectangle in a three-dimensional space.
Figure 1C:
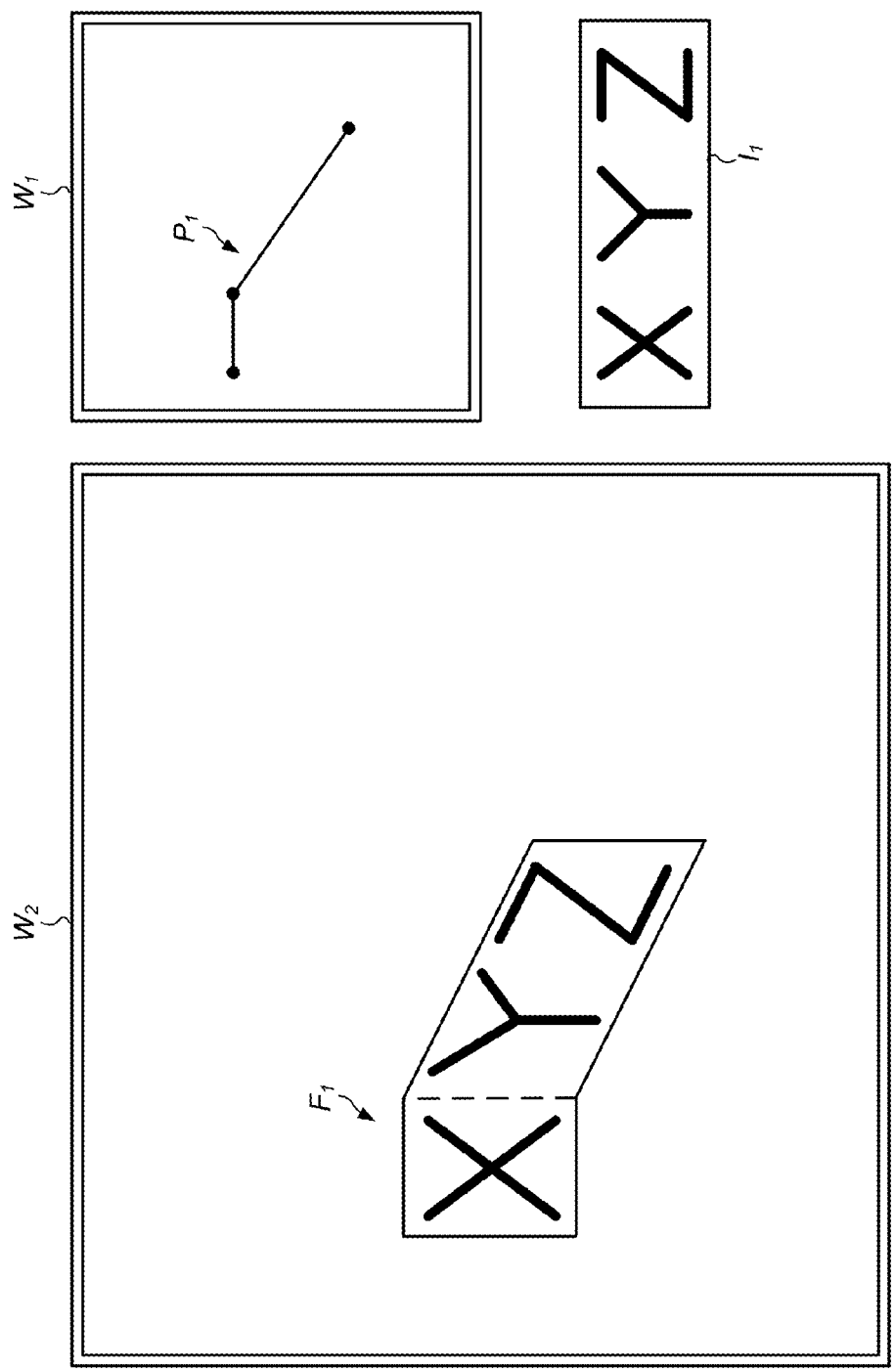
FIG. 1C illustrates another example of an image being painted onto a folded rectangle in the three-dimensional space.

In various embodiments, some of the actions of FIG. 1A may be performed concurrently (or partially concurrently), performed in a different order than shown, or omitted. Additional actions may also be performed, if desired.

In one embodiment, the 3D virtual world may include one or more other graphical objects. Thus, the rendered image obtained by the rendering action 180 (of FIG. 1A) may include visual representation of those one or more graphical objects. For example, the 3D virtual world may include graphical objects such as: objects representing one or more reservoir models; objects representing one or more subsurface horizons; objects representing one or more seismic profiles; and objects representing the three-dimensional trajectory of wells in the earth's subsurface.

Figure 2:
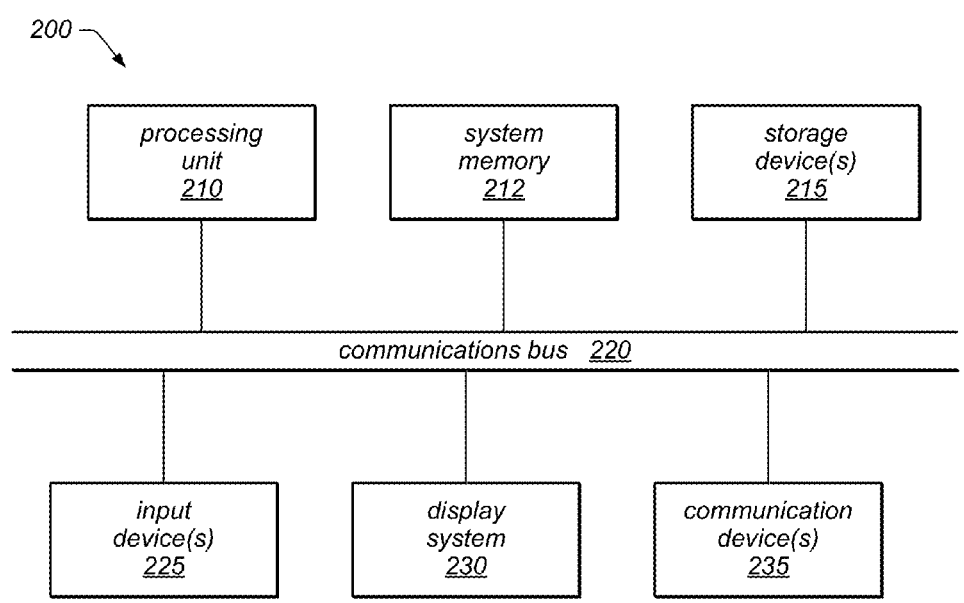
FIG. 2 illustrates one embodiment of a computer system that may be used to execute program instructions.

FIG. 2 illustrates one embodiment of the computer system 200 that may be used to perform the above-described method embodiment, or, any of the method embodiments described herein, or, any combination of the method embodiments described herein. Computer system 200 may include a processing unit 210, a system memory 212, a set 215 of one or more storage devices, a communication bus 220, a set 225 of input devices, and a display system 230.

System memory 212 may include a set of semiconductor devices such as RAM devices (and perhaps also a set of ROM devices).

The set of storage devices 215 may include any of various storage devices such as one or more memory media and/or memory access devices. For example, storage devices 215 may include devices such as a CD-ROM drive, a hard disc, a magnetic disk drive, magnetic tape drives, etc.

Processing unit 210 is configured to read and execute program instructions, e.g., program instructions stored in system memory 212 and/or on one or more of the storage devices 215. Processing unit 210 may couple to system memory 212 through communication bus 220 (or through a system of interconnected busses). The program instructions configure the computer system 200 to implement a method, e.g., any of the method embodiments described herein, or, any combination of the method embodiments described herein, or, any subset of any of the method embodiments described herein.

Processing unit 210 may include one or more programmable processors (e.g., microprocessors).

One or more users may supply input to the computer system 200 through the set 225 of input devices. Input devices 225 may include devices such as a keyboard, a mouse, a touch-sensitive pad, a digitizing drawing pad, a track ball, a light pen, a data glove, eye orientation and/or head orientation sensors, a microphone (or set of microphones), or any combination thereof.

The user input actions described above in connection with FIG. 1A may be performed using one or more of the input devices 225.

The display system 230 may include any of a wide variety of display devices representing any of a wide variety of display technologies. For example, the display system may be a computer monitor, a head-mounted display, a projector system, a volumetric display, or a combination thereof. In some embodiments, the display system may include a plurality of display devices. In one embodiment, the display system includes a printer and/or a plotter.

In some embodiments, the computer system 200 may include other devices, e.g., devices such as a speaker (or set of speakers), a sound card, a video camera and a video card.

The display actions described above in connection with FIG. 1A may be performed using the display system 230.

In one embodiment, computer system 200 may include one or more communication devices 235, e.g., a network interface card for interfacing with a computer network.

The computer system may be configured with a software infrastructure including an operating system and a graphics API (such as OpenGL®, Direct3D, Java 3D™) Thus, the various method embodiments described herein may be implemented in terms of programs that make function call to the operating system or the graphics API as needed. For example, the action of rendering a 3D virtual world may be implemented by a set of one or more calls to a graphics API.

In one embodiment, computer system 200 may be configured to perform the method embodiment of FIG. 1A on behalf of a plurality of users, each with his/her own view into the 3D virtual world. In this embodiment, computer system 200 may communicate with a plurality of client computers over a network. Each of those client computers may includes it own display system and set of input devices. Thus, computer system 200 may receive user input from a client computer over the network and send the rendered image to the client computer over the network. The computer system 200 may maintain independent view information for each of the client computers.

As noted above, the content of the image $I_1$ is not constrained by the present invention. However, it is anticipated that various users may be interested one or more of the following kinds of images: images derived from sensor measurements; images derived from computer simulation; images that represent geological cross sections (e.g., a basin temperature cross section or a structure cross section); images that represent a seismic section; hand drawn and then scanned images; artist's renderings; images that represent well paths through the earth's subsurface; images that represent reservoir model sections; images downloaded from the Internet; images stored in system memory 212; images stored on one of the storage devices 215; images defined by drawing manipulations provided via one or more of the input devices 225; or any combination of the foregoing.

Images containing simple stick figures are used as examples in many of the drawings presented in this patent specification. However, those simple figures are used only for the sake of discussion. They are not meant to suggest or imply a limitation on the kinds of images that can be used with the embodiments described herein.

In one embodiment, a method such as the method of FIG. 1A may also include the action of receiving user input specifying a translucency control value for the geometry data set $S_1$. The geometry data set $S_1$ is rendered with a degree of translucency that is determined by the translucency control value. The degree of translucency varies from transparent to totally opaque. This feature allows the user to see (or partially see) an object(s) behind the folded rectangle, when desired.

Figure 3A:
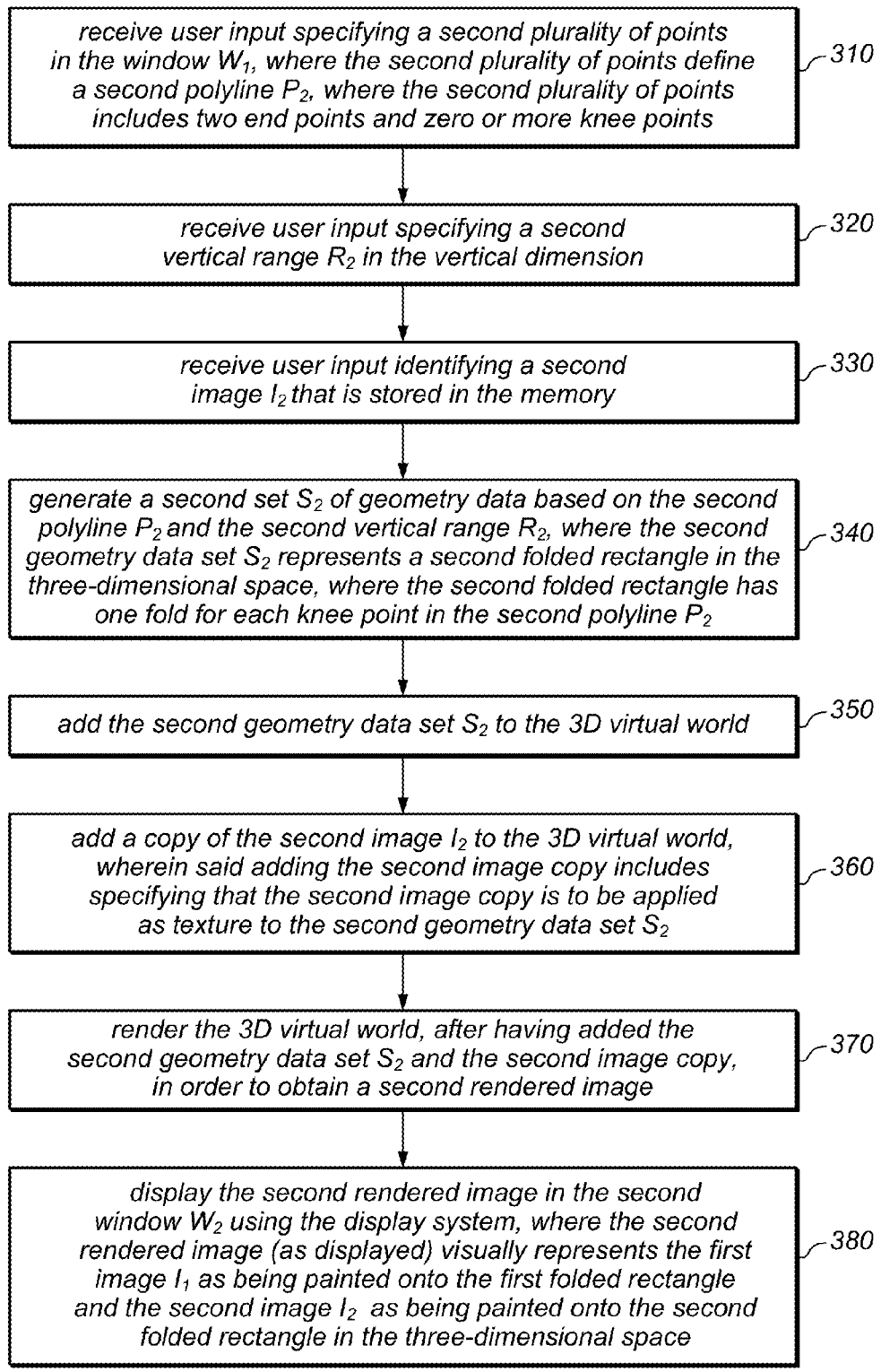
FIG. 3A illustrates one embodiment of a method for adding a second folded rectangle to the three-dimensional space.
Figure 3B:
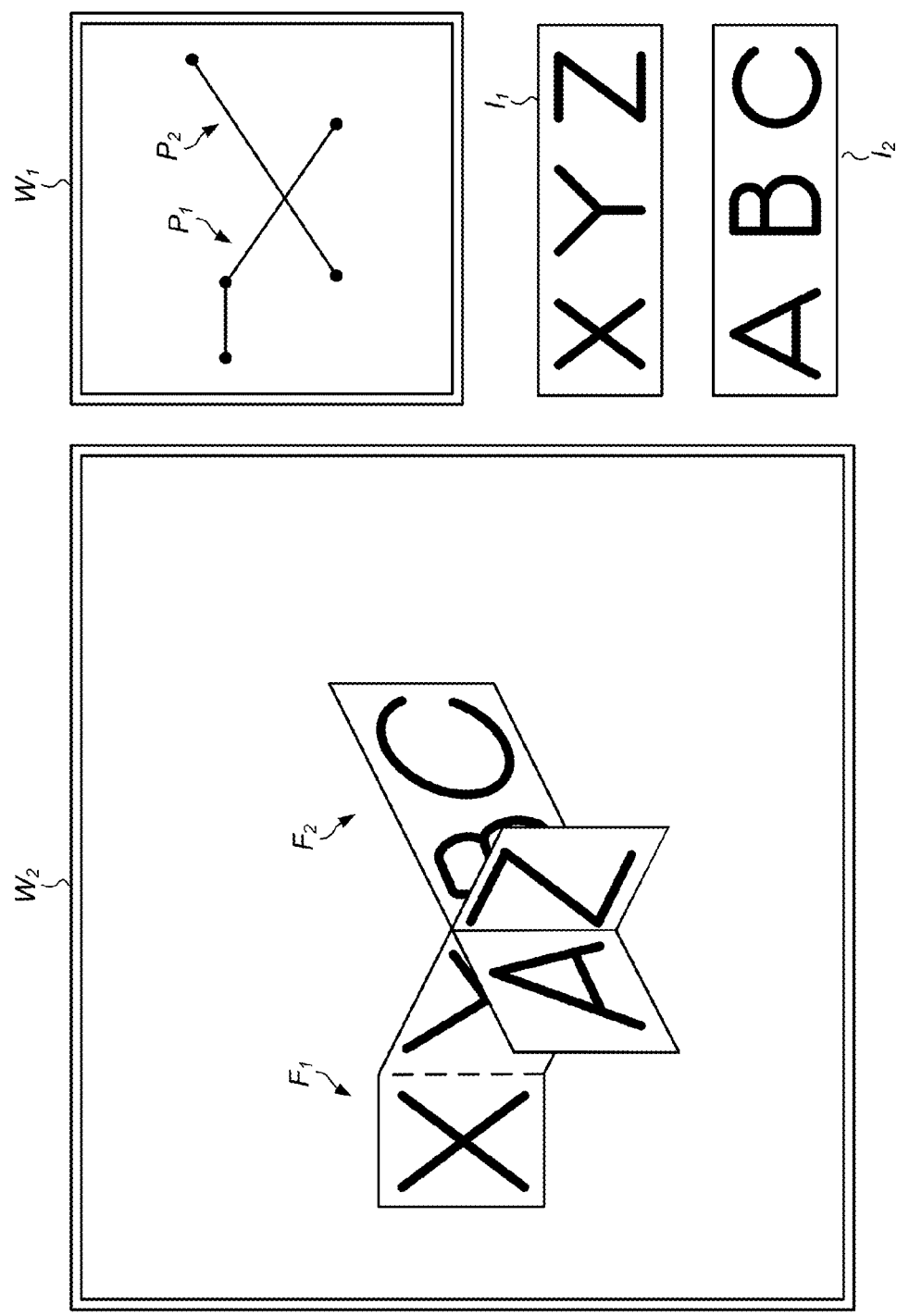
FIG. 3B illustrates an example of two folded rectangles intersecting in the three-dimensional space.

In one embodiment, a method such as the method of FIG. 1A may also support the addition of a second object (folded rectangle with image cover), e.g., as described in FIG. 3A and illustrated in FIG. 3B.

At 310, the computer system may receive user input specifying a second plurality of points in the window $W_1$, where the second plurality of points define a second polyline $P_2$. The second plurality of points includes two end points and zero or more knee points.

At 320, the computer system may receive user input specifying a second vertical range $R_2$ in the vertical dimension.

At 330, the computer system may receive user input identifying a second image $I_2$ that is stored in the memory.

At 340, the computer system may generate a second set $S_2$ of geometry data based on the second polyline $P_2$ and the second vertical range $R_2$, where the second geometry data set $S_2$ represents a second folded rectangle $F_2$ in the three-dimensional space. The second folded rectangle $F_2$ has one fold for each knee point in the second polyline.

At 350, the computer system may add the second geometry data set $S_2$ to the 3D virtual world.

At 360, the computer system may add a copy of the second image $I_2$ to the 3D virtual world, where the action of adding the second image copy includes specifying that the second image copy is to be applied as texture to the second set of geometry data $S_2$.

At 370, the computer system may render the 3D virtual world, after having added the second geometry data set $S_2$ and the second image copy, in order to obtain a second rendered image. This action of rendering the 3D virtual world includes rendering the second geometry data set using the second image copy as texture. It may also include rendering the first geometry data set $S_1$ using the copy of the first image $I_1$ as texture.

At 380, the computer system may display the second rendered image in the second window $W_2$ using the display system, where the second rendered image (as display via the display system) visually represents the first image as being painted onto the first folded rectangle and the second image as being painted onto the second folded rectangle in the three-dimensional space.

Any number of such folded rectangles with respective image covers may be embedded in the three 3D virtual world by repeating the actions of FIG. 2.

Note that the first polyline $P_1$ and the second polyline $P_2$ may intersect each other in the window $W_1$, e.g., as shown in FIG. 3B. In this case, the folded rectangle $F_1$ and the folded rectangle $F_2$ will intersect in the 3D virtual world, provided their vertical ranges ($R_1$ and $R_2$) overlap. FIG. 3B illustrates the intersection of the folded rectangles in the window $W_2$.

Figure 4A:
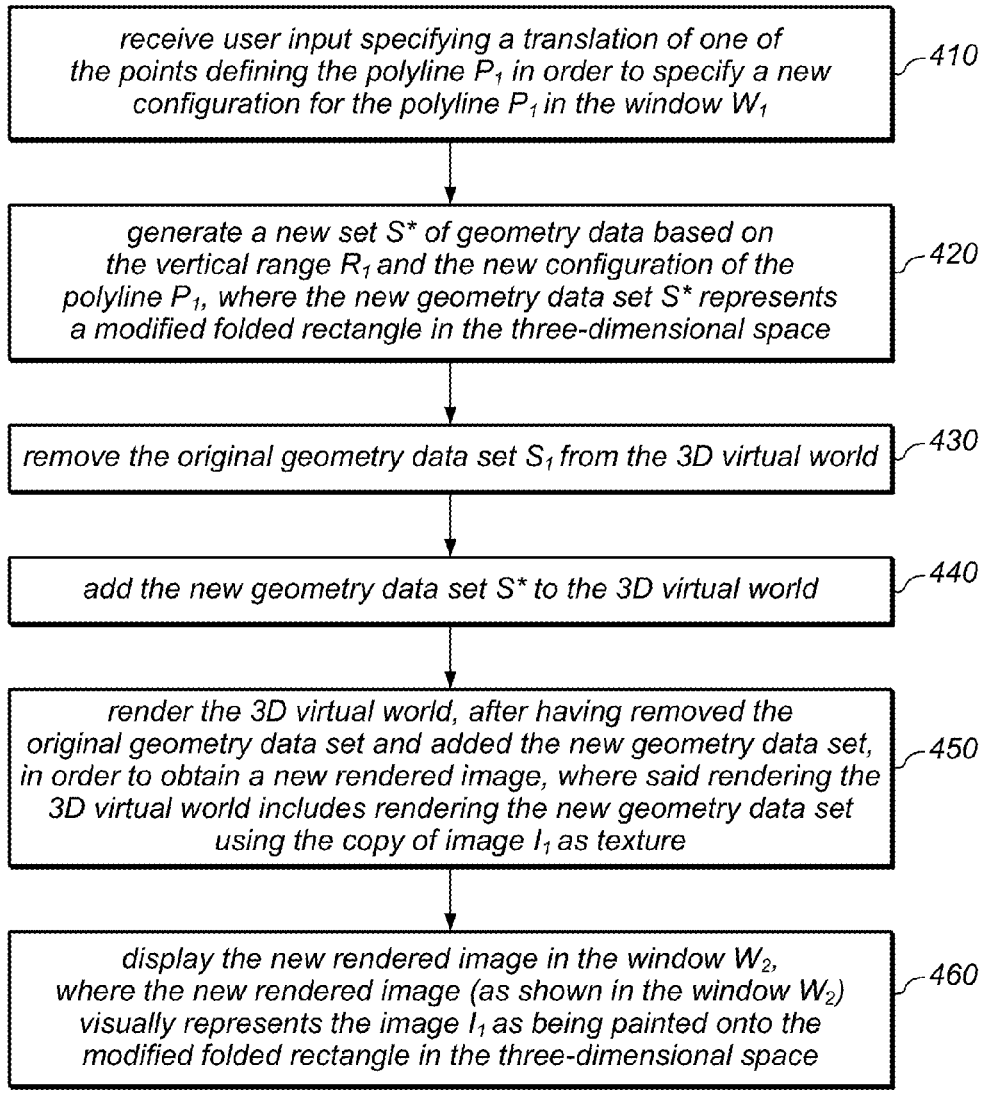
FIG. 4A illustrates one embodiment of a method for modifying the spatial configuration of a folded rectangle in the 3D space.

In one embodiment, a method such as the method of FIG. 1A may also support user manipulation of the folded rectangle $F_1$ by means of input provided via the first window $W_1$. For example, user-directed movement of a selected point on the polyline $P_1$ may induce a corresponding change in spatial configuration of the folded rectangle $F_1$, e.g., as described in connection with FIGS. 4A and 4B.

Figure 4B:
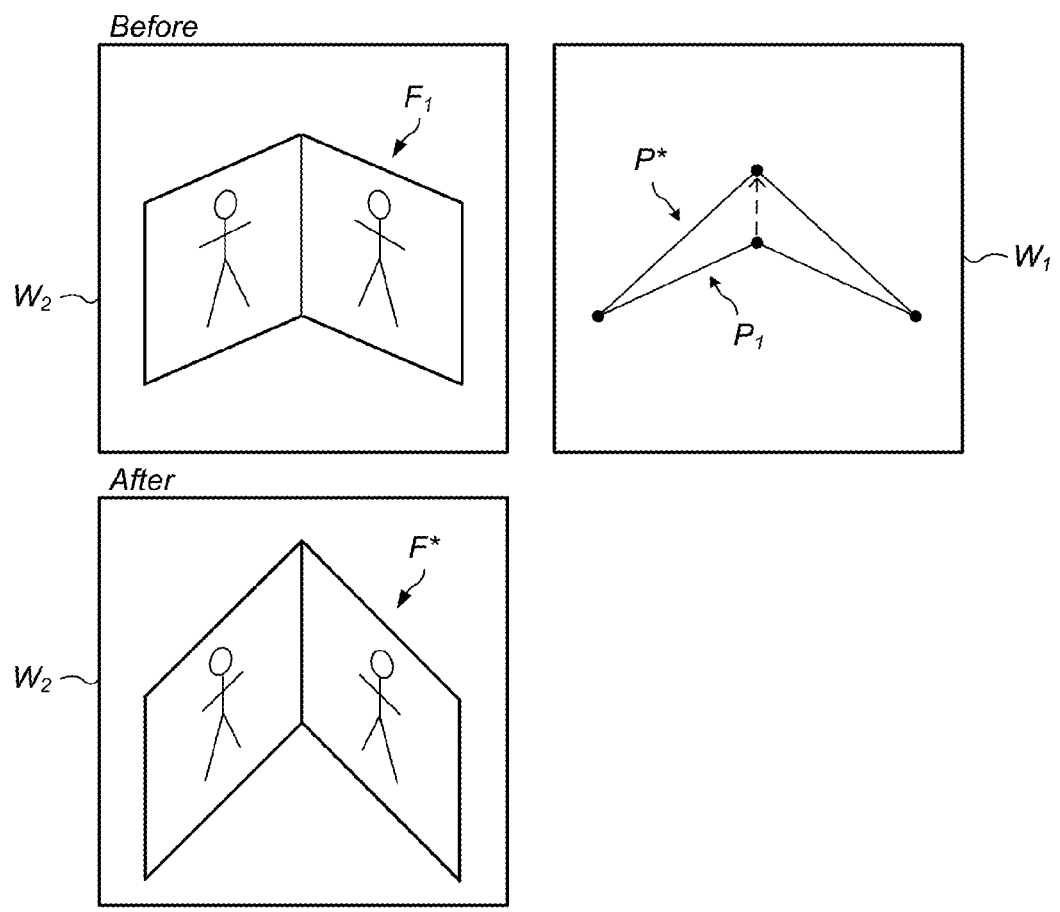
FIG. 4B illustrates an example of a folded rectangle being modified by means of moving a knee point in the corresponding polyline.

At 410, the computer system may receive user input specifying a translation of one of the points defining the polyline $P_1$ in order to specify a new configuration for the polyline in the window $W_1$. The computer system may allow the user to provide the user input via mouse and/or keyboard actions, e.g., using a click and drag manipulation of the mouse. In some embodiments, other input devices may be used as well. The translation may be vector translation within the window $W_1$. The point being translated may be any of the points of the polyline. FIG. 4B illustrates a user input that drags the middle point of the polyline to a new position. The new configuration of the polyline is denoted P*. The original configuration of the polyline may be made to disappear after the user has specified the translation, e.g., by letting go of the left mouse button.

At 420, the computer system may generate a new set S* of geometry data based on the vertical range $R_1$ and the new configuration P* of the polyline $P_1$, where the new geometry data set S* represents a modified folded rectangle F* in the three-dimensional space.

At 430, the computer system may remove the original geometry data set $S_1$ from the 3D virtual world.

At 440, the computer system may add the new geometry data set S* to the 3D virtual world.

At 450, the computer system may render the 3D virtual world (after having removed the geometry data set $S_1$ and added the new geometry data set S*) in order to obtain a new rendered image. This action of rendering the 3D virtual world may include rendering the new geometry data set S* using the copy of image $I_1$ as texture. In FIG. 4B the image $I_1$ is an image comprising two stick men.

At 460, the computer system may display the new rendered image in the second window $W_2$. See the "After" version of window $W_2$ in FIG. 4B. The new rendered image (as shown via the window $W_2$) visually represents the image $I_1$ as being painted onto the modified folded rectangle F* in the three-dimensional space.

Figure 5A:
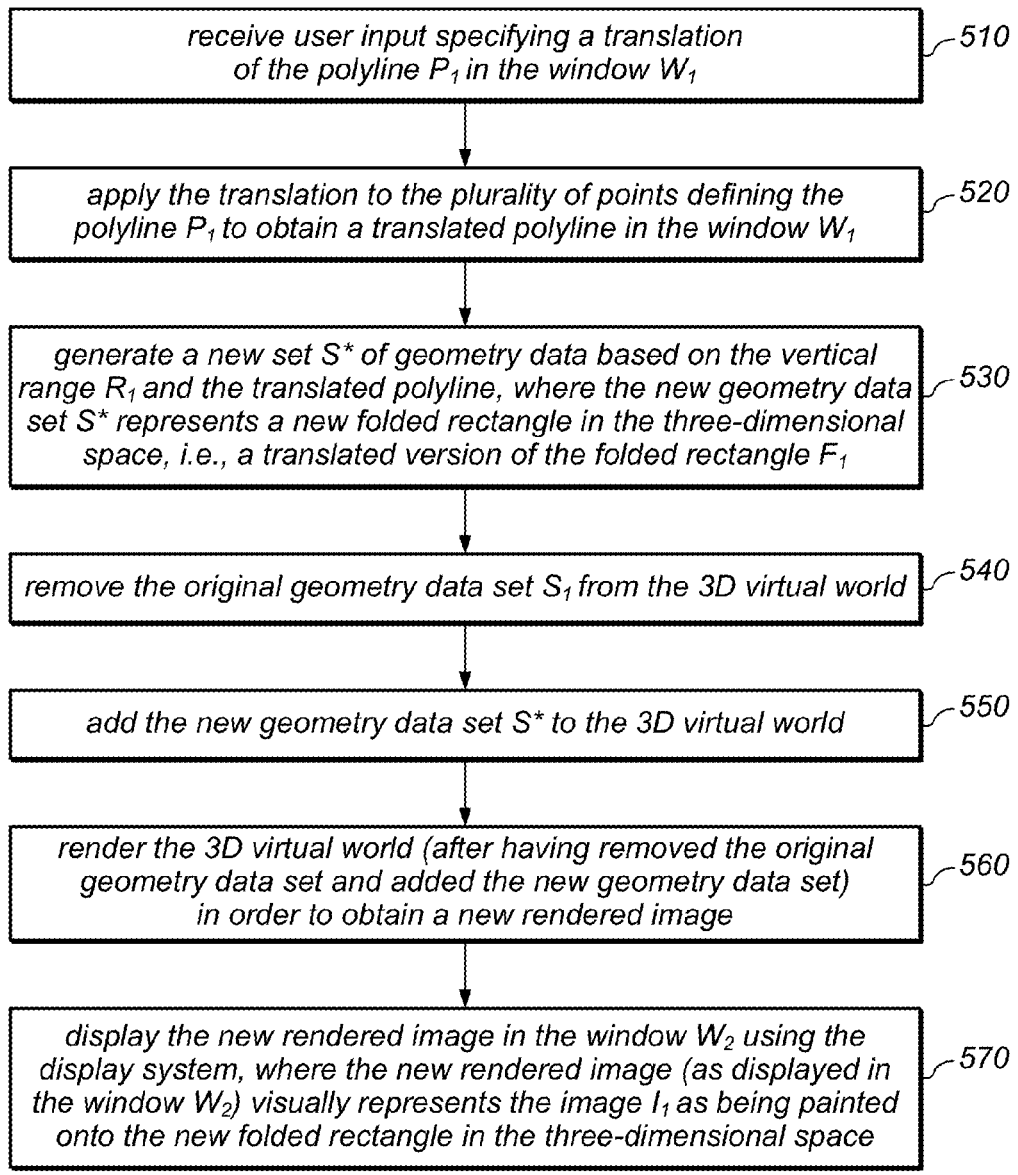
FIG. 5A illustrates one embodiment of a method for translating a folded rectangle in the 3D space by moving the corresponding polyline in the window $W_2$.

In one embodiment, a method such as the method of FIG. 1A may also support user translation of the folded rectangle $F_1$ in the three-dimensional space by means of input provided via the window $W_1$. For example, user-controlled translation of the polyline $P_1$ in the window $W_1$ may induce a corresponding translation of the folded rectangle $F_1$, e.g., as described in connection with FIGS. 5A and 5B.

At 510, the computer system may receive user input specifying a translation of the polyline $P_1$ in the window $W_1$. For example, the user input may be supplied using one of the input devices 225.

Figure 5B:
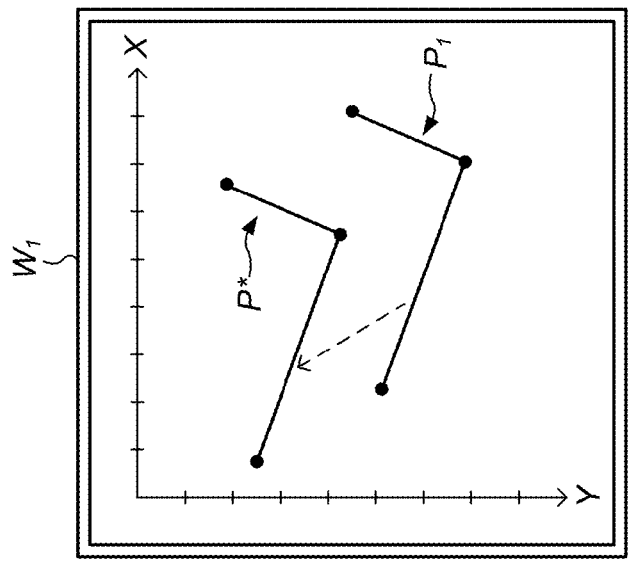
FIG. 5B illustrates an example of the translation of a folded rectangle $F_1$ by moving its corresponding polyline $P_1$ in the window $W_2$.
Figure 5B:
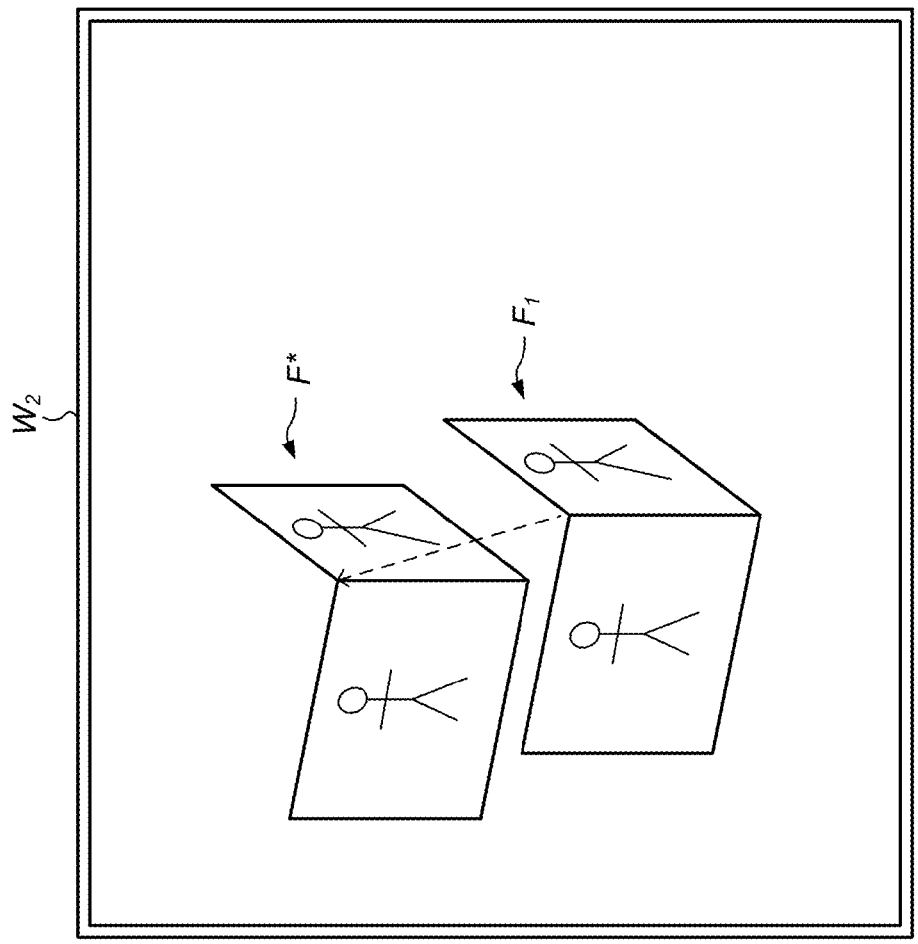

At 520, the computer system may apply the translation to the plurality of points defining the polyline $P_1$ to obtain a translated polyline in the window $W_1$. In one embodiment, the user input is supplied via a mouse and/or keyboard. In FIG. 5B the translated polyline is denoted P*.

At 530, the computer system may generate a new set S* of geometry data based on the vertical range $R_1$ and the translated polyline P*, where the new geometry data set S* represents a new folded rectangle F* in the three-dimensional space, i.e., a translated version of the folded rectangle $F_1$. In one embodiment, the new geometry data set S* is generated by translating each vertex of the original geometry data set $S_1$ based on the user-specified translation in the horizontal plane.

At 540, the computer system may remove the original geometry data set $S_1$ from the 3D virtual world.

At 550, the computer system may add the new geometry data set S* to the 3D virtual world.

At 560, the computer system may render the 3D virtual world (after having removed the original geometry data set and added the new geometry data set) in order to obtain a new rendered image. This action of rendering the 3D virtual world may include rendering the new geometry data set S* using the copy of the image $I_1$ as texture. In FIG. 5B the image $I_1$ is assumed to be an image comprising two stick men.

At 570, the computer system may display the new rendered image in the window $W_2$ using the display system, where the new rendered image (as displayed in the window $W_2$) visually represents the image $I_1$ as being painted onto the new folded rectangle in the three-dimensional space. FIG. 5B shows both the original folded rectangle $F_1$ and the new folded rectangle F* in the same window so the reader of this patent specification may see their spatial relationship. However, the present invention does not require that these two folded rectangles be simultaneously visible at any given point in time. For example, in some embodiments or in some modes of operation, these two folded rectangles are never simultaneously visible in the window $W_2$.

Figure 6A:
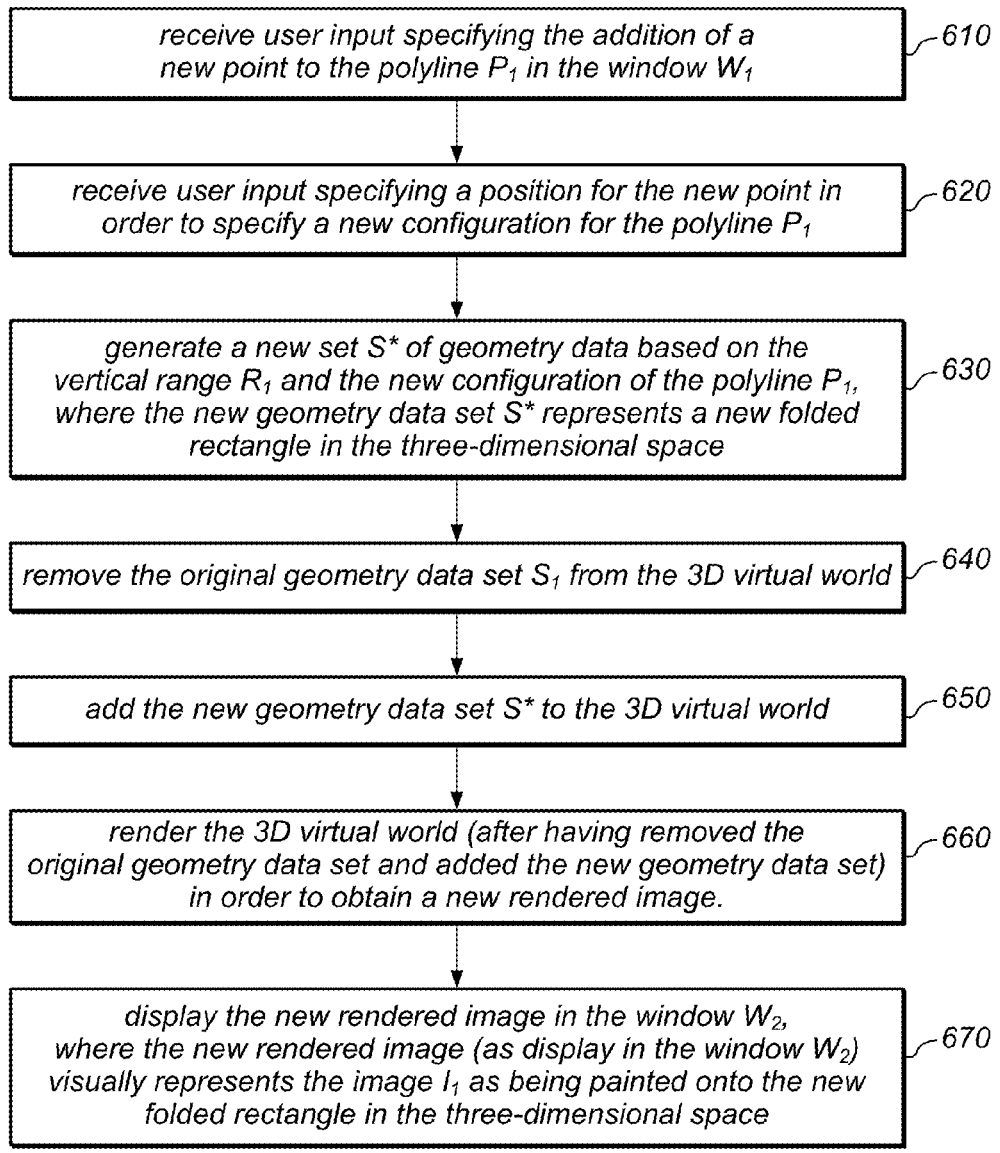
FIG. 6A illustrates one embodiment of a method for adding structure to a folded rectangle in the 3D space by specifying the addition of a point to the corresponding polyline.

In one embodiment, a method such as the method of FIG. 1A may also support the addition of new structure to the folded rectangle $F_1$ by means of input provided via the window $W_1$. For example, when the user adds an additional point to the polyline $P_1$ in the window $W_1$, the computer system may modify the folded rectangle $F_1$ to agree with the new configuration of the polyline, e.g., as described below in connection with FIG. 6A.

At 610, the computer system may receive user input specifying the addition of a new point to the polyline $P_1$ in the window $W_1$.

Figure 6B:
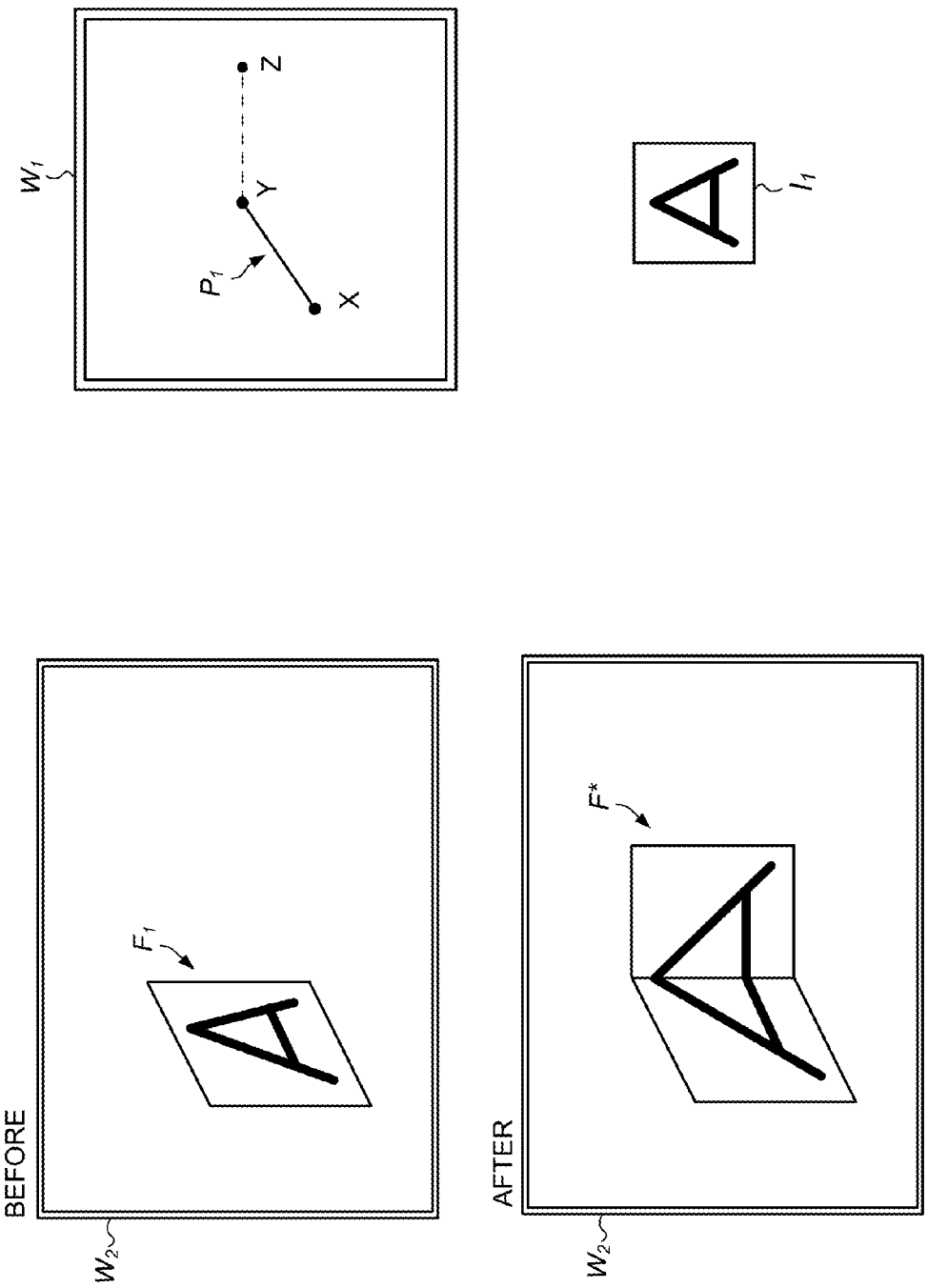
FIG. 6B illustrates an example of the addition of another face to an object in the three-dimensional space by adding another point to the corresponding polyline.

At 620, the computer system may receive user input specifying a position for the new point (in the window $W_1$) in order to specify a new configuration for the polyline $P_1$ in the window $W_1$. In FIG. 6B, a new point Z is added to a polyline $P_1$ that initially includes points X and Y.

At 630, the computer system may generate a new set S* of geometry data based on the vertical range $R_1$ and the new configuration of the polyline $P_1$, where the new geometry data set S* represents a new folded rectangle F* in the three-dimensional space.

At 640, the computer system may remove the original geometry data set $S_1$ from the 3D virtual world.

At 650, the computer system may add the new geometry data set S* to the 3D virtual world.

At 660, the computer system may render the 3D virtual world (after having removed the original geometry data set and added the new geometry data set) in order to obtain a new rendered image. This action of rendering the 3D virtual world may include rendering the new geometry data set S* using the copy of image $I_1$ as texture.

At 670, the computer system may display the new rendered image in the window $W_2$, where the new rendered image (as display in the window $W_2$) visually represents the image $I_1$ as being painted onto the new folded rectangle F* in the three-dimensional space. In FIG. 6B, the image $I_1$ is a simple image containing the letter "A". The BEFORE state of the window $W_2$ shows the folded rectangle $F_1$ that corresponds to the original configuration of the polyline $P_1$. The AFTER state of the window $W_2$ shows the folded rectangle F* that corresponds to the new configuration of the polyline $P_1$.

While FIG. 6B shows a new point being added at the end of a polyline, the computer system may also support the addition of a new point along a user-selected one of the line segments that form the polyline, and the addition of corresponding structure to the folded rectangle in the three-dimensional space.

The computer system may also support the deletion of a user-selected point from a polyline, and the corresponding removal of structure from the folded rectangle in the three-dimensional space.

Figure 7:
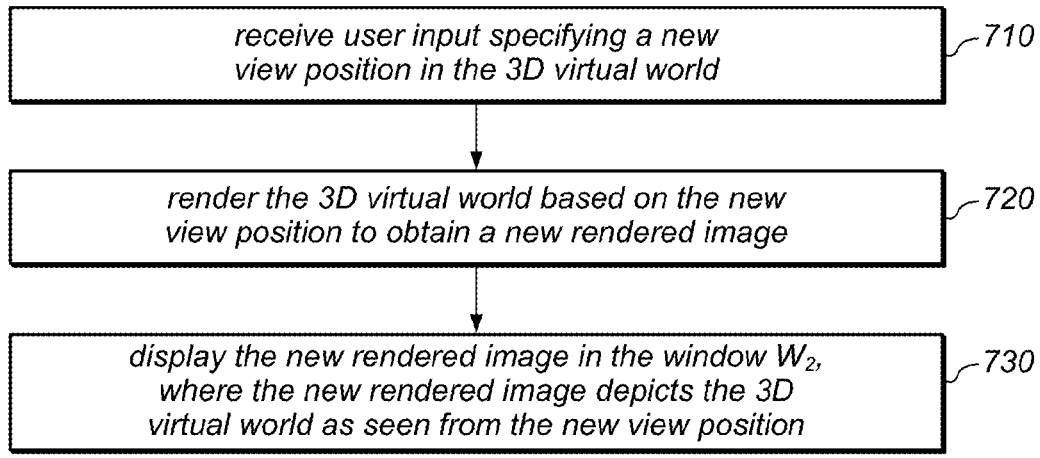
FIG. 7 illustrates one embodiment of a method for moving a view point in the 3D space.

In some embodiments, a method such as the method of FIG. 1A may also allow the user to change the view position of the virtual observer in the 3D virtual world based on user input, e.g., user input provided via the window $W_2$ and/or the window $W_1$. One such embodiment is shown in FIG. 7.

At 710, the computer system may receive user input specifying a new view position in the 3D virtual world. For example, the user may specify the new view position by clicking and dragging inside the window $W_2$. The direction and magnitude of the drag displacement may be used to determine the new view position. Alternatively, the user may specify the new view position by clicking and dragging inside the window $W_1$.

At 720, the computer system may render the 3D virtual world based on the new view position to obtain a new rendered image. This action of rendering the 3D virtual world includes rendering the geometry data set $S_1$ using the copy of image $I_1$ as texture.

At 730, the computer system may display the new rendered image in the window $W_2$. The new rendered image depicts the 3D virtual world (including the folded rectangle $F_1$ with its image drape) as seen from the new view position.

In one mode of view position adjustment, the view position is moved along a directed line defined by the current view position and the current view direction. Thus, the user may move forward to "zoom in" on an object (or the whole environment) or move backward to "zoom out". In one embodiment, the scroll wheel of the mouse may be used to specify such movements.

Figure 8:
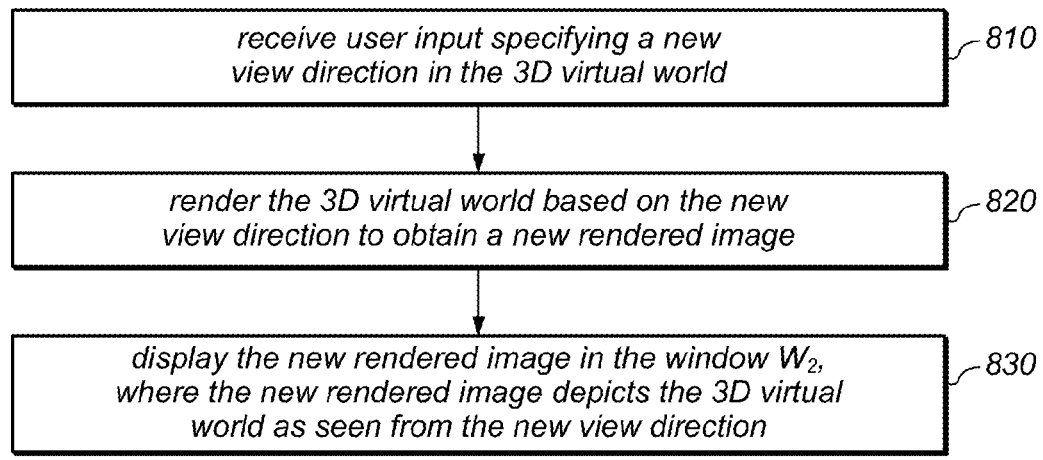
FIG. 8 illustrates one embodiment of a method for changing a view direction in the 3D space.

In one embodiment, a method such as the method of FIG. 1A may also allow the user to change the view direction of the virtual observer in the 3D virtual world based on user input provided in the window $W_2$ and/or the window $W_1$, e.g., as shown in FIG. 8.

At 810, the computer system may receive user input specifying a new view direction in the 3D virtual world. For example, the user may specify the new view direction by means of mouse and/or keyboard manipulations and/or inputs using one or more other ones of the input devices.

At 820, the computer system may render the 3D virtual world based on the new view direction to obtain a new rendered image. This action of rendering the 3D virtual world includes rendering the geometry data set $S_1$ using the copy of image $I_1$ as texture.

At 830, the computer system may display the new rendered image in the window $W_2$. The new rendered image depicts the 3D virtual world (including the folded rectangle $F_1$ with its image drape) as seen from the new view direction.

Figure 9A:
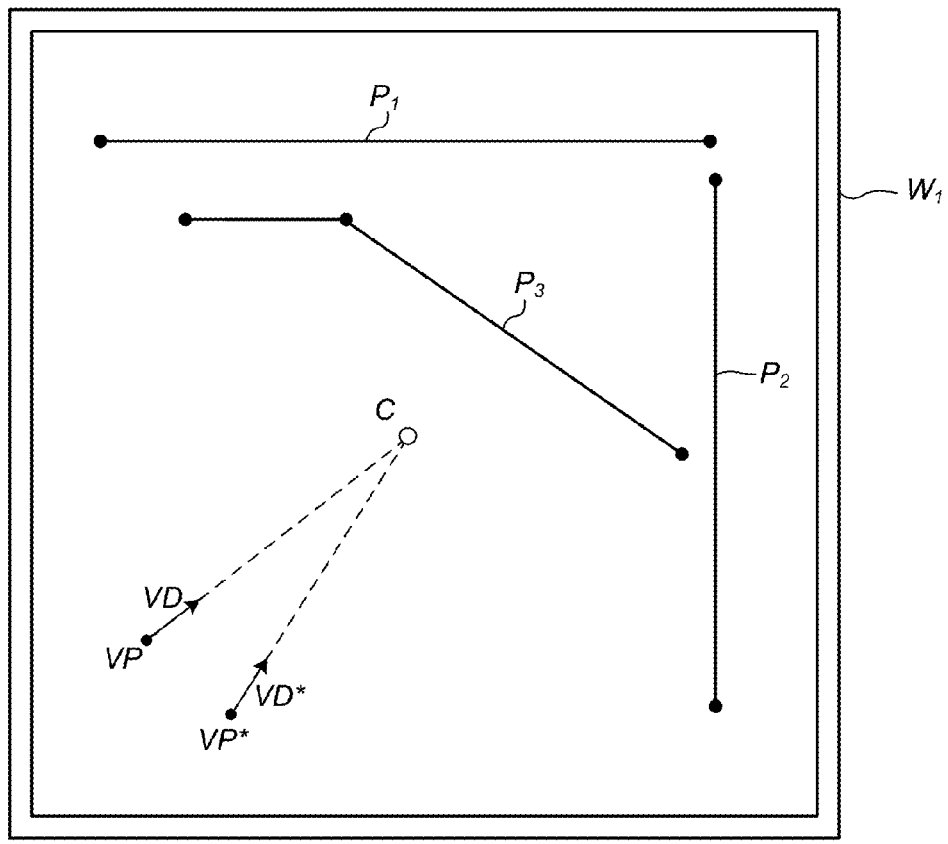
FIG. 9A illustrates an example of adjusting the view point and view direction to achieve the effect of "walking around" the 3D environment.
Figure 9B:
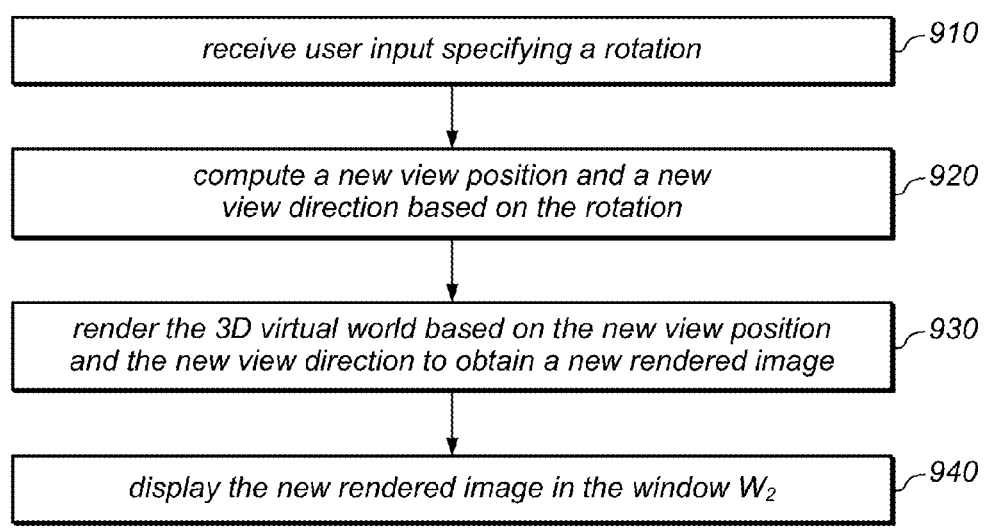
FIG. 9B illustrates one embodiment of a method for simultaneously adjusting the view point and view direction based on a user-specified rotation.

Furthermore, a method such as the method of FIG. 1A may also allow the user to adjust the view point and the view direction simultaneously to achieve the effect of rotating all the objects in the 3D virtual world around some central position in the 3D virtual world. In some embodiments, the view point and view direction may be simultaneously adjusted so that the viewing ray defined by the view point VP and view direction VD rotates about some central point C on the viewing ray, as suggested by FIG. 9A. One such embodiment may by achieved by the following actions, as shown in FIG. 9B.

At 910, the computer system may receive user input specifying a rotation, e.g., a rotation relative to a center point in the 3D virtual world. The user input may be supplied by any of various means. In one embodiment, the user input may be supplied by means of mouse manipulation in the window $W_2$ (or alternatively, in the window $W_1$), e.g., a click and drag manipulation.

At 920, the computer system may compute a new view position and a new view direction based on the rotation. For example, the computer system may compute the new view position and new view direction by applying the rotation to the current view point and current view direction respectively.

At 930, the computer system may render the 3D virtual world based on the new view position and the new view direction to obtain a new rendered image.

At 940, the computer system may display the new rendered image in the window $W_2$. The new rendered image visually represents (depicts) any objects that are visible from the new view point and new view direction.

In one embodiment, a method such as the method of FIG. 1A allows the user to generate an animation on a selected one of the folded rectangles in the three-dimensional space. For example, the image $I_1$ may be part of a user-identified input image sequence stored in memory. The computer system may repeatedly render the 3D virtual world (or, at least the geometry data set $S_1$) to generate an output image sequence, where each rendering uses a different one of the input images as texture for the geometry data set $S_1$. The computer system displays the output image sequence in the window $W_2$ in order to achieve an animation effect on the folded rectangle $F_1$.

In some embodiments, the computer system allows the user to select the domain of the vertical dimension from a set of supported domains. Thus, the computer system may receive user input selecting the domain for the vertical dimension. In one embodiment, the set of supported domains includes at least time (e.g., two-way travel time) and depth (e.g., TVD or TVDSS). TVS is an acronym for True Vertical Depth. TVDSS is an acronym for True Vertical Depth Subsea.

Figure 10A:
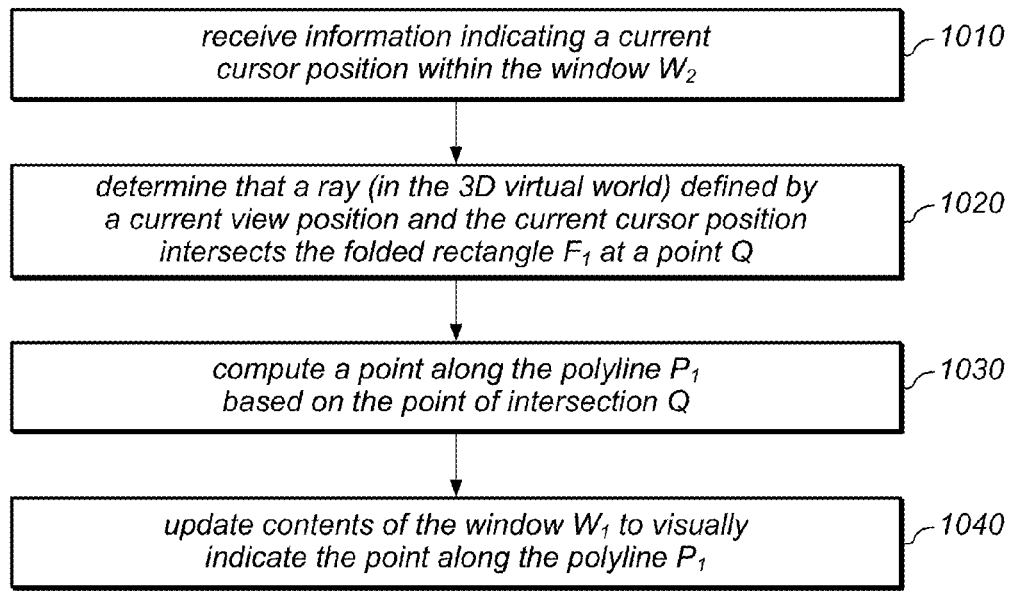
FIG. 10A illustrates one embodiment of a method for highlighting a point on a polyline in the window $W_1$ based on a current cursor position in the window $W_2$.
Figure 10B:
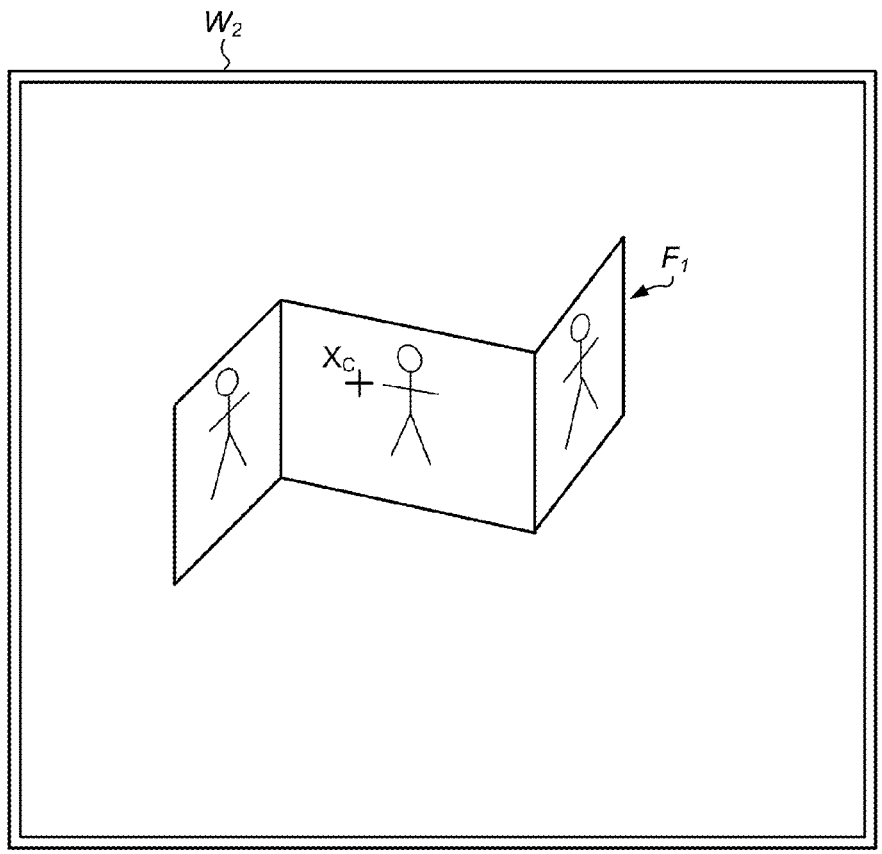
FIG. 10B illustrates an example of the cursor position $X_C$ on the folded rectangle $F_1$ in the window $W_2$.
Figure 10C:
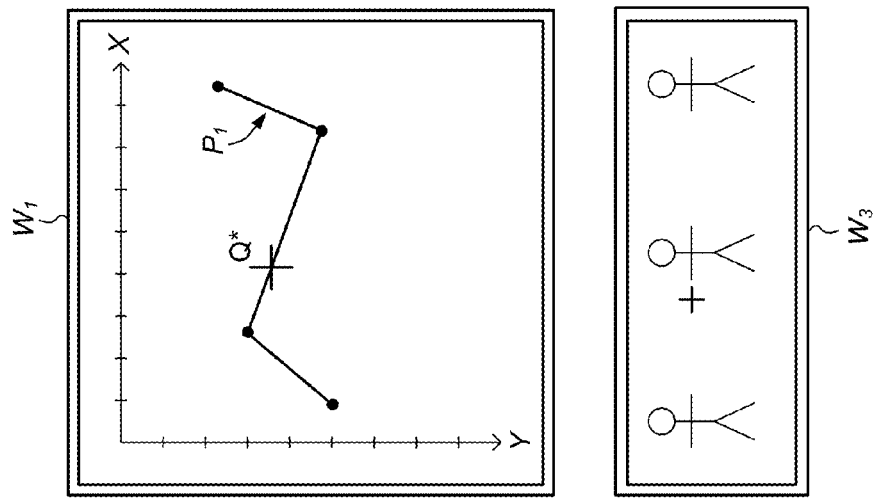
FIG. 10C illustrates an example of the ray defined by the current view point and the current cursor position; the point Q on the folded rectangle $F_1$ that is hit by the ray; and the corresponding point in the window $W_3$ (highlighted with cross hairs).

In one embodiment, a method such as the method of FIG. 1A may also detect a currently identified surface point in the 3D virtual world and highlight the corresponding point on a corresponding polyline in the window $W_1$, e.g., as described below in connection with FIGS. 10A-C.

At 1010, the computer system may receive information indicating a current cursor position $X_C$ within the window $W_2$, e.g., the current position of the mouse cursor. FIG. 10B denotes the cursor position $X_C$ with cross hairs.

At 1020, the computer system may determine that a ray (in the 3D virtual world) defined by a current view position VP and the current cursor position intersects the folded rectangle $F_1$ at a point Q. See the left side of FIG. 10C.

At 1030, the computer system may compute a point $Q^*$ along the polyline $P_1$ based on the point of intersection Q.

At 1040, the computer system may update contents of the window $W_1$ to visually indicate the point $Q^*$ along the polyline $P_1$. For example, the point $Q^*$ may be indicated by crosshairs as shown in FIG. 10C.

The actions 1010 through 1040 may be repeated at a rate sufficient to respond to the instantaneous position of the cursor as the user moves the cursor about in the window $W_2$.

In general, the ray defined by the current view position and the current cursor position can have more than one intersection with objects in the 3D virtual world. When there is more than one intersection, the computer system may select the first intersection point, i.e., the intersection point that is closest to the current view point in the 3D virtual world. If the object that corresponds to the first intersection is a folded rectangle, the computer system may use the above-described method embodiment to determine a point of the corresponding polyline and to highlight that determined point.

Figure 11:
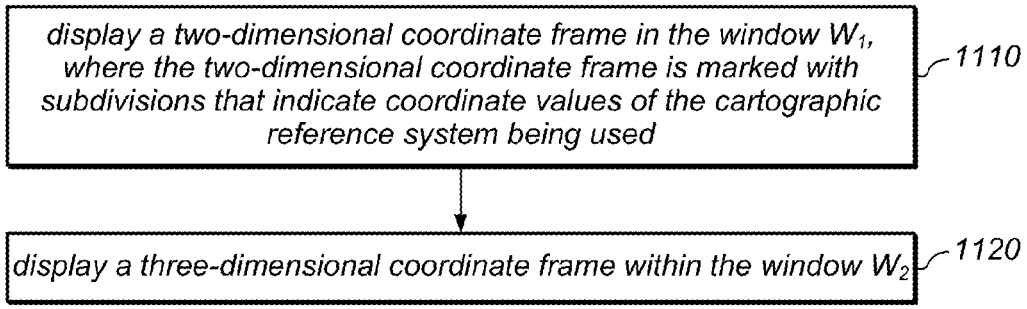
FIG. 11 illustrates one embodiment of a method for displaying coordinate frame information.

A method such as the method of FIG. 1A may also provide one or more visual indicators of the 2D and 3D coordinate systems that are being used by the computer system. For example, in one embodiment, the computer system may perform the following operations, as shown in FIG. 11.

At 1110, the computer system may display a two-dimensional coordinate frame in the window $W_1$, where the two-dimensional coordinate frame is marked with subdivisions that indicate coordinate values of the cartographic reference system being used. See, e.g., FIG. 1B. The 2D coordinate frame may include a pair of axes, or, a two-dimensional grid.

Figure 12A:
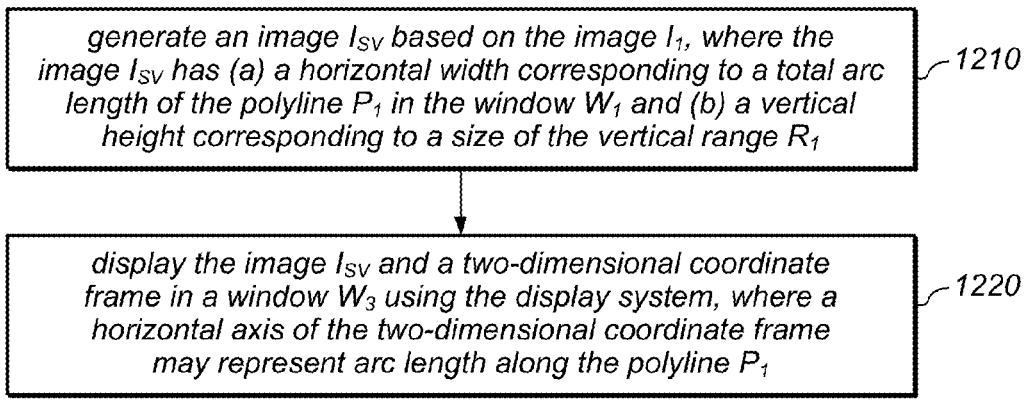
FIG. 12A illustrates one embodiment of a method for generating a "flattened" visualization of a folded rectangle of the three dimensional space.
Figure 12B:
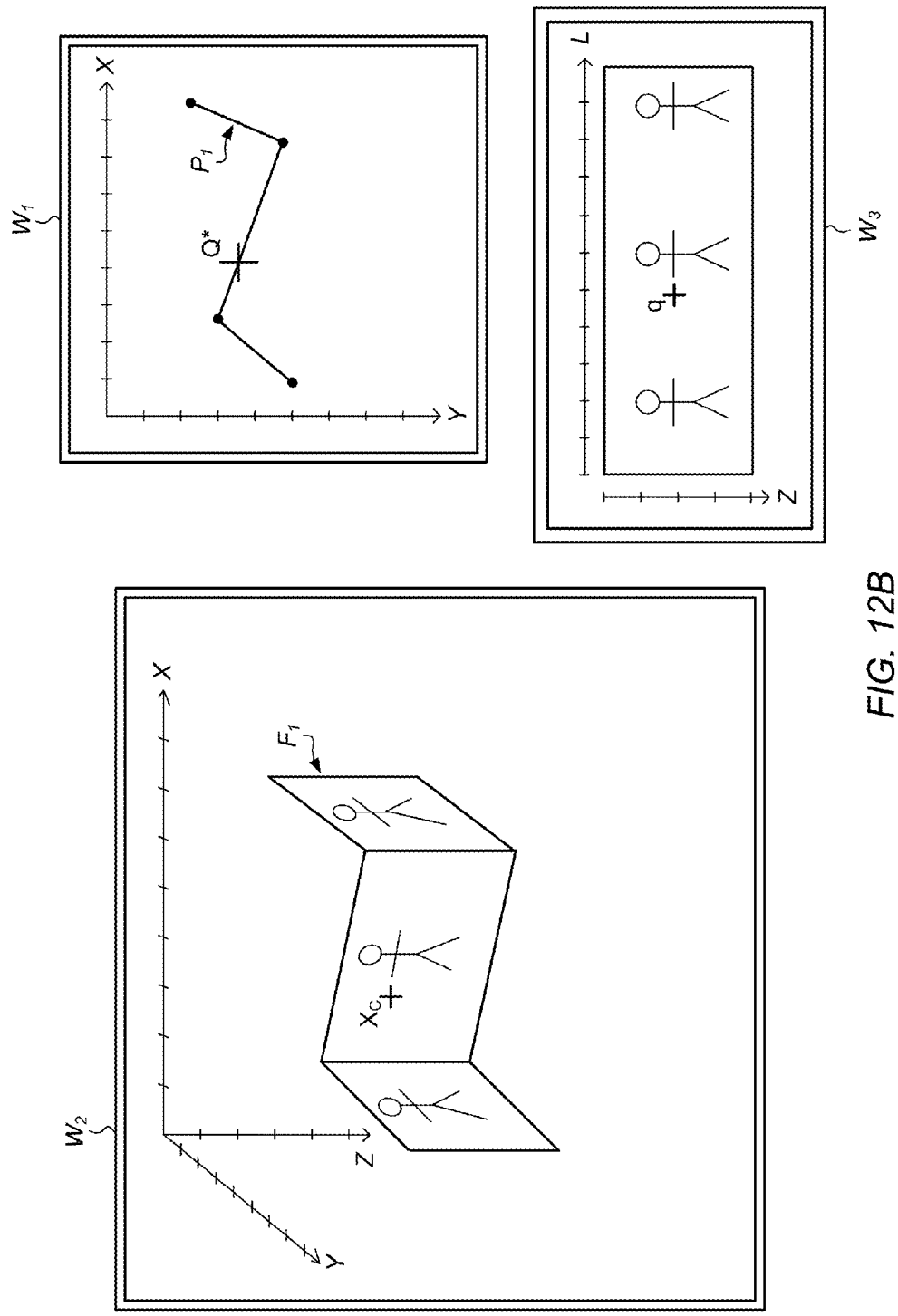
FIG. 12B illustrates an example of the "flattened" visualization (also referred to herein as a "2D section view") in window $W_3$.

At 1120, the computer system may display a three-dimensional coordinate frame within the window $W_2$, e.g., with markings indicating coordinate values. The 3D coordinate frame may include a set of three axes, or alternatively, a visual representation of a 3D grid. See, e.g., FIG. 1B A method such as the method of FIG. 1A may also provide a "2D section view" of a given folded rectangle in the 3D virtual world. The 2D section view may show the user what the folded rectangle (with its "painted on" image) would look like if it were flattened. For example, in one embodiment, the computer system may present such a view by performing the following operations, as shown in FIGS. 12A and 12B.

At 1210, the computer system may generate an image $I_{SV}$ based on the image $I_1$, where the image $I_{SV}$ has (a) a horizontal width corresponding to a total arc length of the polyline $P_1$ in the window $W_1$ and (b) a vertical height corresponding to a size of the vertical range $R_1$. In one embodiment, the horizontal width is proportional to the total arc length of the polyline $P_1$, and the vertical height is proportional (with the same proportionality constant) to the size of the vertical range $R_1$.

At 1220, the computer system may display the image $I_{SV}$ and a two-dimensional coordinate frame in a window $W_3$ using the display system. A horizontal axis of the two-dimensional coordinate frame may represent arc length L along the polyline $P_1$ (or along the top edge of the folded rectangle $F_1$). A vertical axis of the two-dimensional coordinate frame may represent position within the vertical range $R_1$. See FIG. 12B.

In one embodiment, a method such as the method of FIG. 12 may also detect a currently identified surface point on a folded rectangle in the window $W_2$ and highlight the corresponding point on the image in window $W_3$. FIG. 12C illustrates one such example. The user has positioned a cursor in window $W_2$ so that it rests at point $X_C$ on the folded rectangle $F_1$. The computer system highlights the corresponding point q on the image in window $W_3$.

Figure 13A:
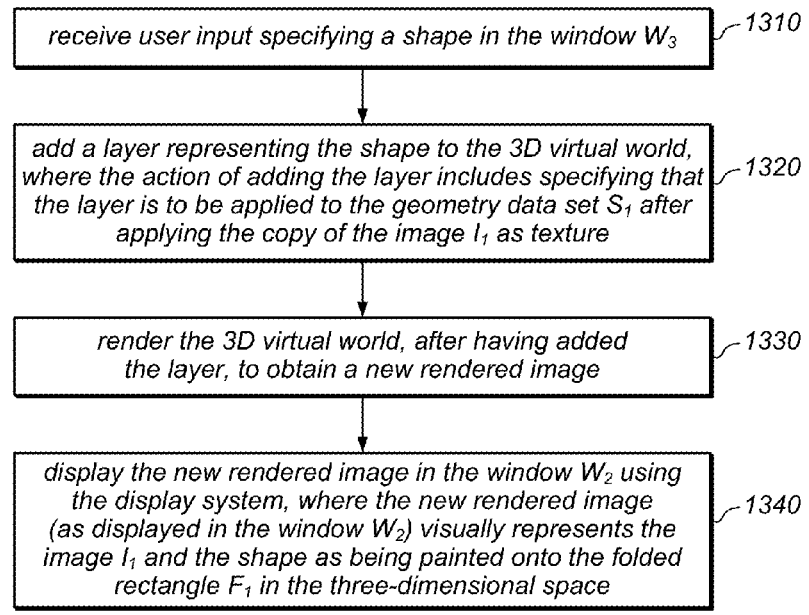
FIG. 13A illustrates one embodiment of a method for drawing, writing or typing on a folded rectangle in the 3D space.

In some embodiments, a method such as the method of FIG. 1A or the method of FIG. 12A may also provide the user with the ability to draw (or write or type) on a folded rectangle, e.g., to draw on top of the image that has already been painted onto the folded rectangle. One such embodiment is described below in connection with FIGS. 13A and 13B.

Figure 13B:
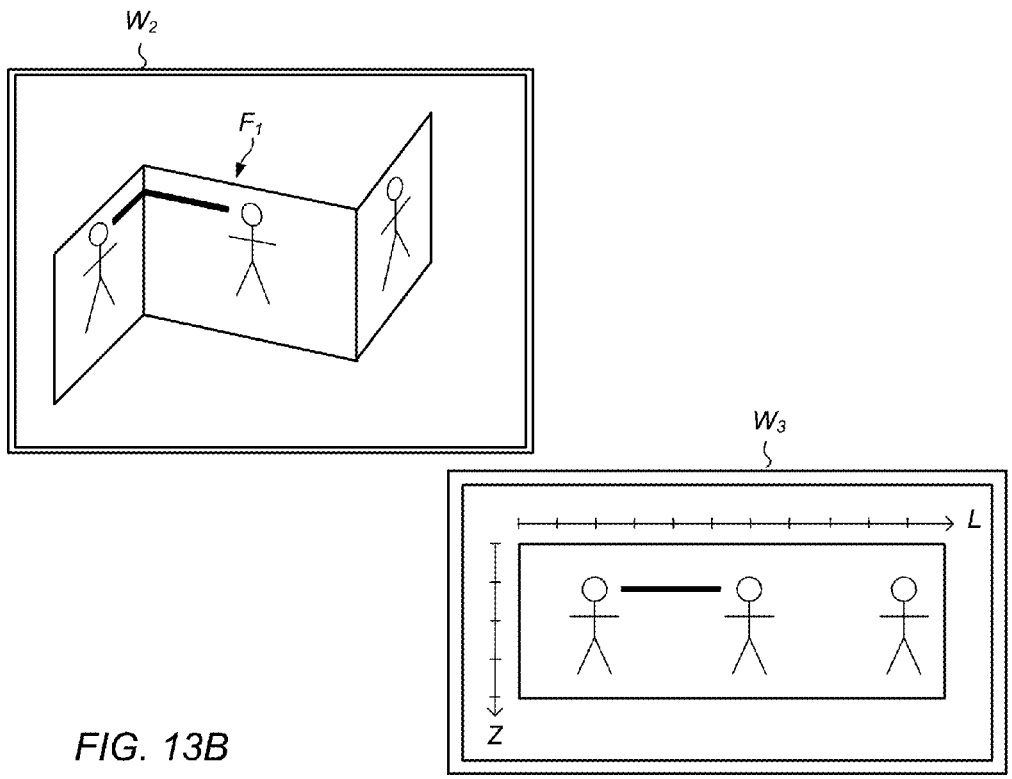
FIG. 13B illustrates an example of drawing a horizontal line in the image of window $W_3$ and having that drawing appear on the folded rectangle $F_1$.

At 1310, the computer system may receive user input specifying a shape in the window $W_3$. The user input may be provided using one or more of the input devices 225, e.g., using the mouse or a drawing tool. In one drawing mode, the shape may be a curve or a set of curves. FIG. 13B illustrates the shape as being a horizontal line extending between the first and second stick men from the left. In another drawing mode, the shape may be a closed figure such as a polygonal object, a circle, an ellipse, etc. In a text mode, the user input is text. Thus, the shape represents the user-supplied text.

At 1320, the computer system may add a layer representing the shape to the 3D virtual world, where the action of adding the layer includes specifying that the layer is to be applied to the geometry data set $S_1$ after applying the copy of the image $I_1$ as texture. (Thus, the added layer is said to be "coincident" with the geometry data set $S_1$.)

At 1330, the computer system may render the geometry data set $S_1$, after having added the layer, to obtain a new rendered image.

At 1340, the computer system may display the new rendered image in the window $W_2$ using the display system, where the new rendered image (as displayed in the window $W_2$) visually represents the image $I_1$ and the shape as being painted onto the folded rectangle $F_1$ in the three-dimensional space. In FIG. 13B, note that the line between the stick men has been painted onto the surface of the image-covered folded rectangle $F_1$.

In some embodiments, a method such as the method of FIG. 1A may also allow a user to add a spatially-localized annotation to one of the folded rectangles in the 3D virtual world. One such embodiment is described below in connection with FIG. 14. A user may wish to add a spatially-localized annotation to express his/her interpretation of an image feature that appears on the image-covered folded rectangle $F_1$ at the intersection point Q. In some embodiments, the annotation may be made visible to one or more other users of the computer system.

At 1410, the computer system may receive user input indicating a desire to add a spatially-localized annotation to the 3D virtual world.

At 1420, the computer system may receive user input indicating a current cursor position within the window $W_2$.

At 1430, the computer system may determine that a ray defined by a current view position and the current cursor position intersects the folded rectangle $F_1$ at a point Q in the three-dimensional space.

At 1440, the computer system may receive user input specifying (or identifying) data to be associated with the folded rectangle $F_1$ and the intersection point Q. The data may represent the user's interpretation of some feature on the image-covered folded rectangle $F_1$ at the intersection point Q.

The data may take any of a variety of forms. For example, in one embodiment, the data may include a character string (e.g., a string of keyboard characters entered by the user). In another embodiment, the data may include a character string, a voice recording, a video recording, or any combination thereof.

Figure 14A:
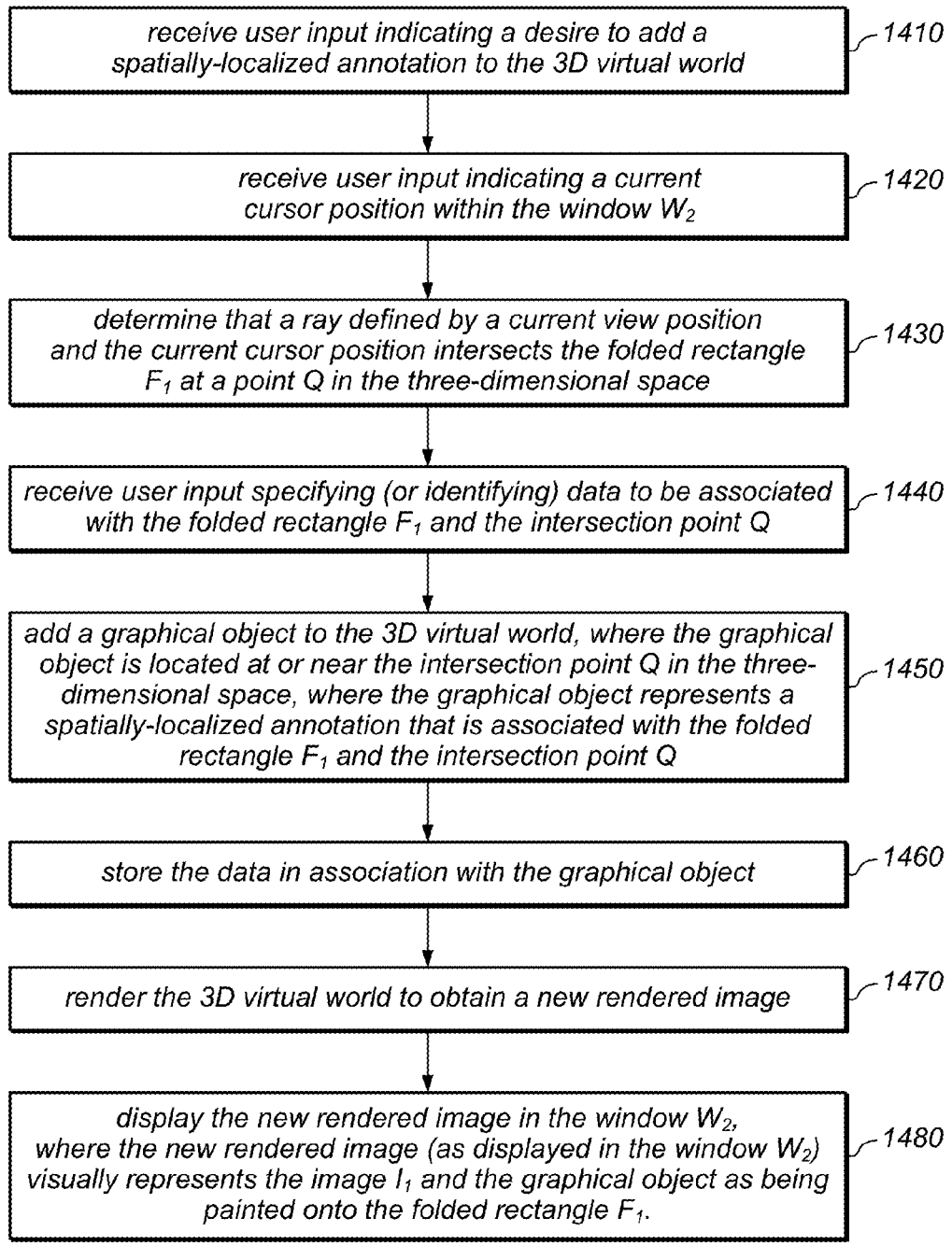
FIG. 14A illustrates one embodiment of a method for adding a spatially-localized note to the surface on an object such as one of the folded rectangles in the 3D space.
Figure 14B:
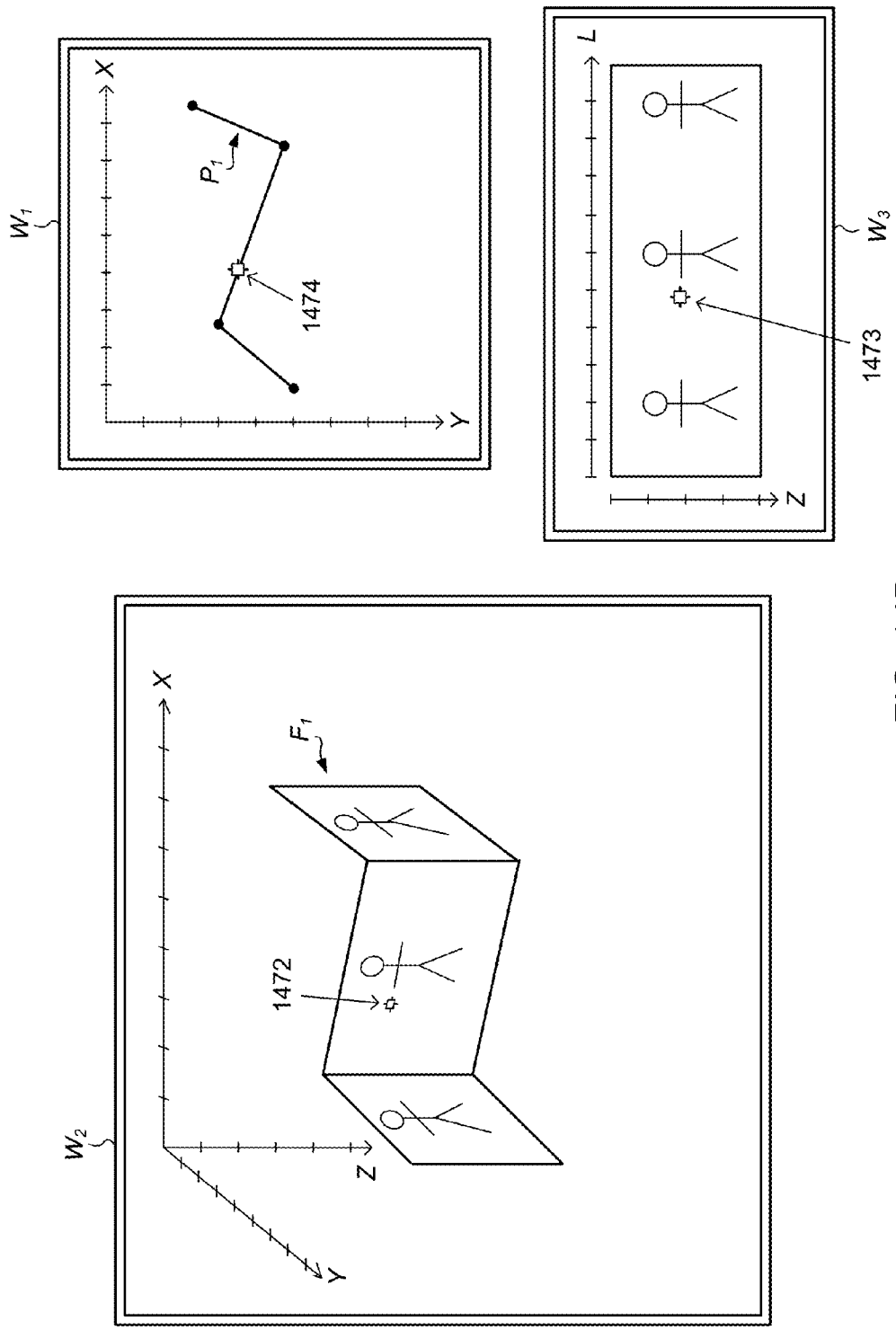
FIG. 14B illustrates an example of a graphical indicator 1472 being injected onto the folded rectangle $F_1$ to indicate the presence of a spatially-localized note.

At 1450, the computer system may add a graphical object $G_{SLA}$ to the 3D virtual world, where the graphical object $G_{SLA}$ is located at or near the intersection point Q in the three-dimensional space. The graphical object represents (or indicates) a spatially-localized annotation that is associated with the folded rectangle $F_1$ and the intersection point Q. In some embodiments, the graphical object is a two-dimensional object. In FIG. 14B, the graphical object is a set of cross hairs with superimposed rectangle. (See item 1472.)

At 1460, the computer system may store the data in association with the graphical object. For example, data may be linked to the graphical object, or stored underneath the same node (of the 3D virtual world) as the graphical object.

At 1470, the computer system may render the 3D virtual world (or at least the geometry data set $S_1$) to obtain a new rendered image. The rendering of the 3D virtual world includes rendering the geometry data set $S_1$ using the copy of image $I_1$ and the graphical object $G_{SLA}$.

At 1480, the computer system may display the new rendered image in the window $W_2$. The new rendered image (as displayed in the window $W_2$) visually represents the image $I_1$ and the graphical object as being painted onto the folded rectangle $F_1$.

In one embodiment, a method such as the method of FIG. 14 may allow the user to display (or playback) the data associated with a spatially-localized annotation as follows.

First, the computer system may receive user input from the window $W_2$ selecting the graphical object $G_{SLA}$ that represents (or indicates) the spatially-localized annotation. In one embodiment, the user may click (or double click) on the graphical object using the mouse to select the graphical object. (In the example of FIG. 14B, the user may click on graphical object 1472.) In another embodiment, the user may simply hover over the graphical object to select it.

Second, the computer system may display (or playback) the data via an output device in response to receiving the user input selecting the graphical object. The form of the display/playback may depend on the nature of the data. In one embodiment, the action of displaying may include expanding the size of the graphical object and displaying the data within the graphical object in the window $W_2$.

As shown in FIG. 14B, the computer system may also attach an indicator 1473 to the image in window $W_3$ to indicate the presence of the spatially-localized annotation. The indicator 1473 may be located at a position that corresponds to the intersection point Q on the folded rectangle $F_1$. Similarly, the computer system may attach an indicator 1474 to the polyline $P_1$ in the window $W_1$ to indicate the presence of a spatially localized annotation. By selecting the indicator 1473 or 1474, the user may induce display (or playback or presentation) of the annotation data.

Figure 15:
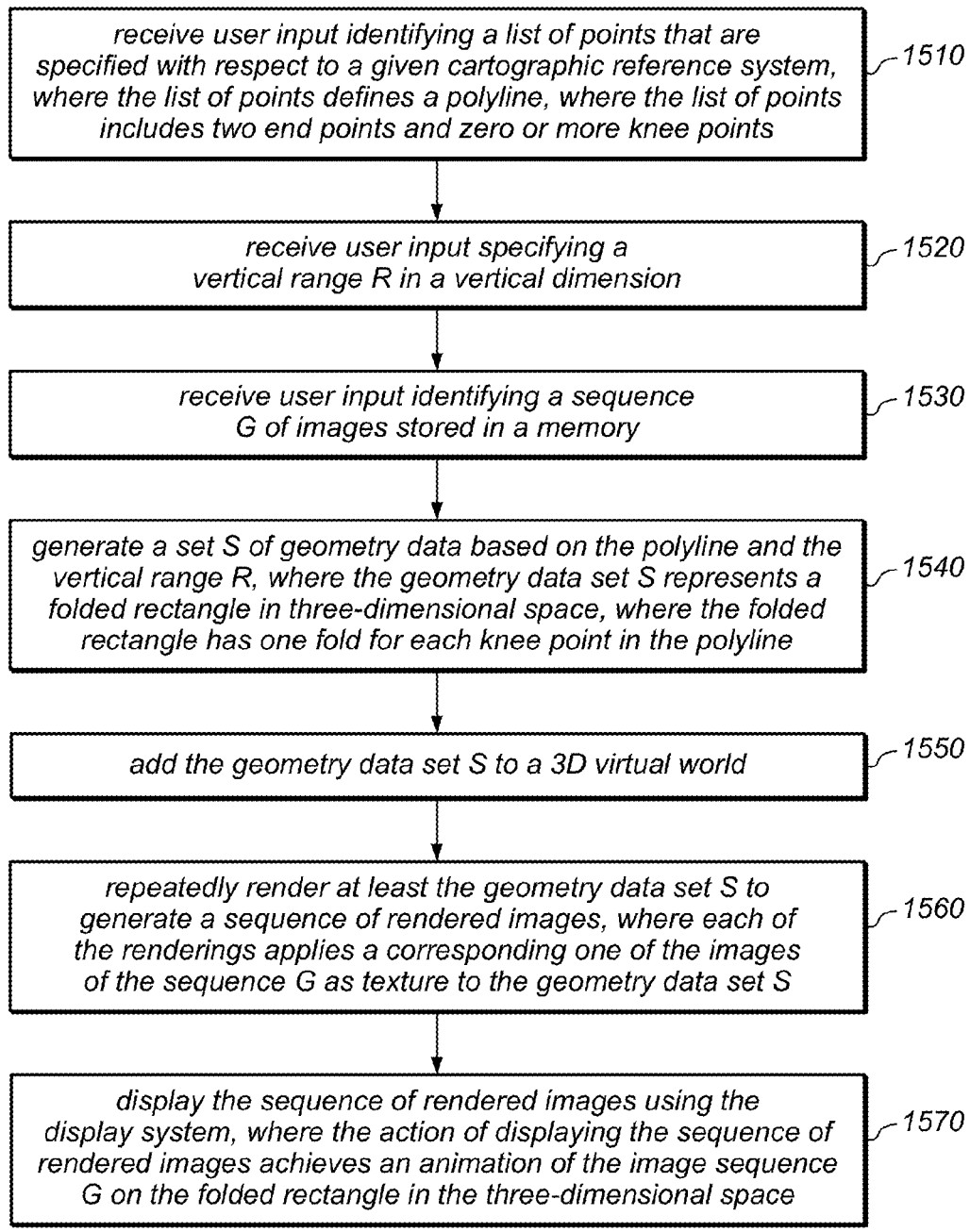
FIG. 15 illustrates one embodiment of a method for animating a given one of the folded rectangle in the 3D space, i.e., animating with a series of images.

In some embodiments, a computer-implemented method 1500 for visualizing a sequence of images in a three-dimensional (3D) environment may involve the following operations, as shown in FIG. 15.

At 1510, a computer system (e.g., computer system 200 of FIG. 2) may receive user input identifying a list of points that are specified with respect to a given cartographic reference system. The list of points defines a polyline. The list of points may include two end points and zero or more knee points.

At 1520, the computer system may receive user input specifying a vertical range R in a vertical dimension. As described above, the vertical dimension may extend perpendicularly to a given portion (e.g., a user-specified portion) of the earth's surface.

At 1530, the computer system may receive user input identifying a sequence G of images stored in the memory. The computer system may allow the user to identify the images of the sequence individually. Alternatively, the computer system may allow the user to identify a file that specifies the image sequence, e.g., a GIF file. In one embodiment, the image sequence G may be a video sequence. Thus, the action of identifying a sequence of images may be the identification (or selection) of a video data file. In some embodiments, the image sequence G is stored in a compressed form. Thus, the action of identifying the image sequence G may be interpreted as an identification of a compressed data file that represents the image sequence G.

At 1540, the computer system may generate a set of geometry data S based on the polyline and the vertical range R, where the geometry data set S represents a folded rectangle in three-dimensional space. The folded rectangle has one fold for each knee point in the polyline.

At 1550, the computer system may add the geometry data set S to a 3D virtual world.

At 1560, the computer system may repeatedly render the 3D virtual world (or at least the geometry data set S) to generate a sequence of rendered images. Each of the renderings applies a corresponding one of the images of the sequence G as texture to the geometry data set S to obtain a corresponding on the rendered images.

At 1570, the computer system may display the sequence of the rendered images using the display system, where the action of displaying the sequence of rendered images achieves an animation of the image sequence G on the folded rectangle in the three-dimensional space.

Operations 1560 and 1570 may be performed concurrently (or at least partially concurrently). For example, each rendered image may be displayed after it has been generated and without waiting on the next rendered image to be generated.

Various embodiments described herein may be used to create georeferenced raster imagery for vertical line or section display in 2D and 3D renderings of the earth's subsurface.

Geographic coordinates may be assigned to raster image pixel locations to support vertical section display in 2D/3D views. The coordinate definition may include a reference system, vertical domain, surface (XY) locations, and vertical (Z) range. These images may be used by geoscientists who are interpreting the earth's subsurface geometry.

Figure 16:
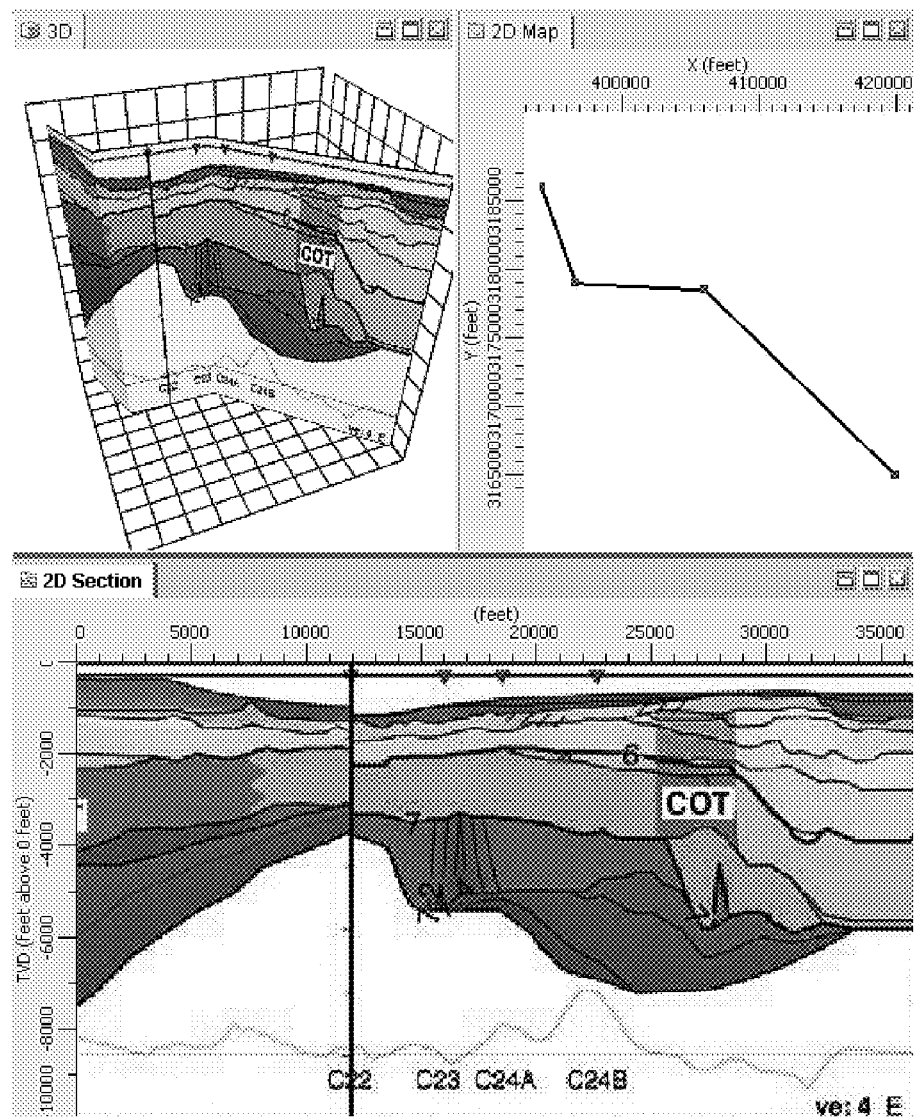
FIG. 16 illustrates multiple views of a vertically georeferenced raster image according to one embodiment.

The example shown in FIG. 16 demonstrates a set of 2D/3D views of a vertically georeferenced raster image. The "2D Section" view shows the images with the defined vertical domain and Z range. The "2D Map" view shows the defined surface (XY) location for the raster image. The "3D" view shows the georeferenced raster image in a three dimensional space.

Vertically georeferenced raster images (e.g., the image-painted folded rectangles described variously above) may provide a mechanism for integrating seismic section data from geologic ideas, scanned drawings/images or other data sources into a 2D/3D viewer. These data may be integrated with other information to help guide geologic or geophysical interpretation of the earth's subsurface.

The vertically georeferenced raster images maintain spatial relationships with other data types allowing geoscience interpreters to better understand the subsurface.

The various labels used herein—such as $I_1$, $I_2$, $W_1$ and $W_2$—are not meant of themselves to imply special significance for the things they label. Rather, they are intended as a means distinguishing different things. For example, the labels "$I_1$" and "$I_2$" imply that image $I_1$ is not the same as image $I_2$.

Any two or more of the embodiments described herein may be combined to form a more complex embodiment.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A non-transitory computer-accessible memory medium storing program instructions, wherein the program instructions are executable by a computer system to:
   display a first window using a display system, wherein the first window represents a given portion of the earth's surface according to a given cartographic reference system;
   receive user input specifying a first plurality of points in the first window, wherein the first plurality of points define a first polyline, wherein the first plurality of points includes two end points and at least one knee point;
   receive user input specifying a first vertical range in a vertical dimension that extends perpendicular to the given portion of the earth's surface;
   receive user input identifying a first image that has been previously stored in a memory;
   generate a first set of geometry data based on the first polyline and the first vertical range, wherein the first set of geometry data represents a first folded rectangle in three-dimensional space, wherein the first folded rectangle has one fold for each knee point in the first polyline;
   add the first set of geometry data to a 3D virtual world;
   add a copy of the first image to the 3D virtual world, wherein said adding the first image copy to the 3D virtual world includes specifying that the first image copy is to be applied as texture to the first set of geometry data;
   render the 3D virtual world to obtain a rendered image, wherein said rendering includes rendering the first set of geometry data using the first image copy as texture; and
   display the rendered image in a second window using the display system, wherein the displayed rendered image visually represents the first image as being painted onto the first folded rectangle in the three-dimensional space;
   receive user input specifying a rotation of the view position relative to a specified center point in the 3D virtual world;
   compute a rotated view position based on the rotation;
   render the 3D virtual world based on the rotated view position to obtain an updated rendered image; and
   display the updated rendered image.

2. The memory medium of claim 1, wherein the program instructions are executable by the computer system to:
   receive user input specifying a second plurality of points in the first window, wherein the second plurality of points define a second polyline, wherein the second plurality of points includes two end points and zero or more knee points;
   receive user input specifying a second vertical range in the vertical dimension;
   receive user input identifying a second image that is stored in the memory;
   generate a second set of geometry data based on the second polyline and the second vertical range, wherein the second set of geometry data represents a second folded rectangle in the three-dimensional space, wherein the second folded rectangle has one fold for each knee point in the second polyline;
   add the second set of geometry data to the 3D virtual world;
   add a copy of the second image to the 3D virtual world, wherein said adding the second image copy includes specifying that the second image copy is to be applied as texture to the second set of geometry data;
   render the 3D virtual world, after having added the second set of geometry data and the second image copy, in order to obtain a second rendered image; and
   display the second rendered image in the second window using the display system, wherein the displayed second rendered image visually represents the first image as being painted onto the first folded rectangle and the second image as being painted onto the second folded rectangle in the three-dimensional space.

3. The memory medium of claim 2, wherein the first polyline and the second polyline intersect in the first window, wherein the first folded rectangle and the second folded rectangle intersect in the 3D virtual world.

4. The memory medium of claim 1, wherein the program instructions are executable by the computer system to:
   receive user input specifying a translation of one of the first plurality of points in order to specify a new configuration for the first polyline in the first window;
   generate a second set of geometry data based on the first vertical range and the new configuration of the first polyline, wherein the second set of geometry data represents a second folded rectangle in the three-dimensional space;
   remove the first set of geometry data from the 3D virtual world;
   add the second set of geometry data to the 3D virtual world;
   render the 3D virtual world, after having removed the first set of geometry data and added the second set of geometry data, in order to obtain a second rendered image, wherein said rendering the 3D virtual world includes rendering the second set of geometry using the first image copy as texture; and
   display the second rendered image in the second window, wherein the displayed second rendered image visually represents the first image as being painted onto the second folded rectangle in the three-dimensional space.

5. The memory medium of claim 1, wherein the program instructions are executable by the computer system to:
   receive user input specifying a translation of the first polyline in the first window;
   apply the translation to the first plurality of points to obtain a translated polyline;
   generate a second set of geometry data based on the first vertical range and the translated polyline, wherein the second set of geometry data represents a second folded rectangle in the three-dimensional space;

remove the first set of geometry data from the 3D virtual world;
add the second set of geometry data to the 3D virtual world;
render the 3D virtual world, after having removed the first set of geometry data and added the second set of geometry data, in order to obtain a second rendered image; and
display the second rendered image in the second window, wherein the displayed second rendered image visually represents the first image as being painted onto the second folded rectangle in the three-dimensional space.

6. The memory medium of claim 1, wherein the program instructions are executable by the computer system to:
receive user input specifying an addition of a new point to the first polyline;
receive user input specifying a position for the new point in order to specify a new configuration for the first polyline;
generate a second set of geometry data based on the first vertical range and the new configuration of the first polyline, wherein the second set of geometry data represents a second folded rectangle in the three-dimensional space;
remove the first set of geometry data from the 3D virtual world;
add the second set of geometry data to the 3D virtual world;
render the 3D virtual world, after having removed the first set of geometry data and added the second set of geometry data, in order to obtain a second rendered image; and
display the second rendered image in the second window, wherein the displayed second rendered image visually represents the first image as being painted onto the second folded rectangle in the three-dimensional space.

7. The memory medium of claim 1, wherein the program instructions are executable by the computer system to:
receive user input specifying a new view position in the 3D virtual world;
render the 3D virtual world based on the new view position to obtain an updated rendered image; and
display the updated rendered image.

8. The memory medium of claim 1, wherein the program instructions are executable by the computer system to:
receive user input specifying a new view direction in the 3D virtual world;
render the 3D virtual world based on the new view direction to obtain an updated rendered image; and
display the updated rendered image.

9. The memory medium of claim 1, wherein the first image represents a geological cross section or a seismic section, wherein the displayed rendered image is usable to determine a drilling location for a substance deposited in the earth.

10. The memory medium of claim 1, wherein the program instructions are executable by the computer system to:
receive user input selecting a domain for the vertical dimension, wherein the domain is selected from a set of domains including: time and depth.

11. The memory medium of claim 1, wherein the 3D virtual world includes at least one graphical object representing a petroleum reservoir, wherein the displayed rendering image is usable to estimate a number of wells to drill in the petroleum reservoir.

12. The memory medium of claim 1, wherein the 3D virtual world includes a graphical object representing a subsurface horizon.

13. The memory medium of claim 1, wherein the program instructions are executable by the computer system to:
display a two-dimensional coordinate frame in the first window, wherein the two-dimensional coordinate frame is marked with subdivisions that indicate coordinate values of the given cartographic reference system; and
display a three-dimensional coordinate frame within the second window.

14. The memory medium of claim 1, wherein the program instructions are executable by the computer system to:
generate a third image based on the first image, wherein the third image has: a horizontal width corresponding to a total arc length of the first polyline in the first window, and vertical height corresponding to a size of the first vertical range; and
display the third image and a two-dimensional coordinate frame in a third window using the display system, wherein a horizontal axis of the two-dimensional coordinate frame represents arc length along the polyline.

15. The memory medium of claim 14, wherein the program instructions are executable by the computer system to:
receive user input specifying a shape in the third window;
add a layer representing the shape to the 3D virtual world, wherein said adding the layer includes specifying that the layer is to be applied to the first set of geometry data after applying the first image copy as texture;
render the first set of geometry data, after having added the layer, to obtain a second rendered image; and
display the second rendered image in the second window using the display system, wherein the displayed second rendered image visually represents the first image and the shape as being painted onto the first folded rectangle in the three-dimensional space.

16. The memory medium of claim 1, wherein the program instructions are executable by the computer system to:
receive user input indicating a current cursor position within the second window;
determine that a ray defined by a current view position and the current cursor position in the three-dimensional space intersects the first folded rectangle at a first point in the three-dimensional space;
receive user input specifying data to be associated with the first folded rectangle and the first point;
add a graphical object to the 3D virtual world, wherein the graphical object is located at or near the first point in the three-dimensional space, wherein the graphical object represents a spatially-localized annotation that is associated with the first folded rectangle and the first point;
store the data in association with the graphical object;
render the 3D virtual world to obtain a new rendered image; and
display the new rendered image in the second window, wherein the displayed new rendered image visually represents the first image and the graphical object as being painted onto the first folded rectangle.

17. The memory medium of claim 16, further comprising:
receive user input selecting the graphical object;
display the data via an output device in response to receiving the user input selecting the graphical object.

18. The memory medium of claim 1, wherein said first plurality of points are specified by mouse-based manipulations in the first window.

19. A computer-implemented method comprising:
a computer system receiving a first list of points specified with respect to a given cartographic reference system, wherein the first list of points define a first polyline, wherein the first list of points includes two end points and at least one knee point;

the computer system receiving user input identifying a first sequence of images that have been previously stored in a memory;

the computer system generating a first set of geometry data based on the first polyline and a first user-specified vertical range, wherein the first set of geometry data represents a first folded rectangle in three-dimensional space, wherein the first folded rectangle has one fold for each knee point in the first polyline;

the computer system adding the first set of geometry data to a 3D virtual world;

the computer system repeatedly rendering at least the first set of geometry data to generate a second sequence of rendered images, wherein each of the repeated renderings applies a corresponding one of the images of the first sequence as texture to the first set of geometry data; and the computer system displaying the second sequence of the rendered images using a display system, wherein said displaying the second sequence of rendered images achieves an animation of the first sequence of images on the first folded rectangle in the three-dimensional space;

the computer system receiving user input specifying a rotation of the view position relative to a specified center point in the 3D virtual world;

the computer system computing a rotated view position based on the rotation;

the computer system rendering the 3D virtual world based on the rotated view position to obtain an updated rendered image; and the computer system displaying the updated rendered image.

20. A computer system comprising:
one or more processors; and
a memory that stores program instructions, wherein the program instructions are executable by the one or more processors to:
   receive user input identifying a first image that has been previously stored in the memory;
   receive user input specifying a first polyline in a given cartographic reference system;
   display the first polyline in a first window using a display system;
   generate a first set of geometry data based on the first polyline and a user-specified vertical range, wherein the first set of geometry data represents a folded object in three-dimensional space, wherein the folded object has one fold for each knee point in the first polyline;
   render a 3D virtual world to obtain a rendered image, wherein said rendering the 3D virtual world includes rendering the first set of geometry data using the first image as texture; and
   display the rendered image in a second window using the display system, wherein the displayed rendered image visually represents the first image as being painted onto the folded object in the three-dimensional space;
   receive user input specifying a rotation of the view position relative to a specified center point in the 3D virtual world;
   compute a rotated view position based on the rotation;
   render the 3D virtual world based on the rotated view position to obtain an updated rendered image; and
   display the updated rendered image.

21. A non-transitory computer-accessible memory medium storing program instructions, wherein the program instructions are executable by a computer system to:
   display a first window using a display system, wherein the first window represents a given portion of the earth's surface according to a given cartographic reference system;
   receive user input specifying a first plurality of points in the first window, wherein the first plurality of points define a first polyline, wherein the first plurality of points includes two end points and at least one knee point;
   receive user input specifying a first vertical range in a vertical dimension that extends perpendicular to the given portion of the earth's surface;
   receive user input identifying a first image that has been previously stored in a memory;
   generate a first set of geometry data based on the first polyline and the first vertical range, wherein the first set of geometry data represents a first folded rectangle in three-dimensional space, wherein the first folded rectangle has one fold for each knee point in the first polyline;
   add the first set of geometry data to a 3D virtual world;
   add a copy of the first image to the 3D virtual world, wherein said adding the first image copy to the 3D virtual world includes specifying that the first image copy is to be applied as texture to the first set of geometry data;
   render the 3D virtual world to obtain a rendered image, wherein said rendering includes rendering the first set of geometry data using the first image copy as texture; and
   display the rendered image in a second window using the display system, wherein the displayed rendered image visually represents the first image as being painted onto the first folded rectangle in the three-dimensional space;
   receive user input specifying a second plurality of points in the first window, wherein the second plurality of points define a second polyline, wherein the second plurality of points includes two end points and zero or more knee points;
   receive user input specifying a second vertical range in the vertical dimension;
   receive user input identifying a second image that is stored in the memory;
   generate a second set of geometry data based on the second polyline and the second vertical range, wherein the second set of geometry data represents a second folded rectangle in the three-dimensional space, wherein the second folded rectangle has one fold for each knee point in the second polyline;
   add the second set of geometry data to the 3D virtual world;
   add a copy of the second image to the 3D virtual world, wherein said adding the second image copy includes specifying that the second image copy is to be applied as texture to the second set of geometry data;
   render the 3D virtual world, after having added the second set of geometry data and the second image copy, in order to obtain a second rendered image; and
   display the second rendered image in the second window using the display system, wherein the displayed second rendered image visually represents the first image as being painted onto the first folded rectangle and the second image as being painted onto the second folded rectangle in the three-dimensional space;
   wherein the first polyline and the second polyline intersect in the first window, wherein the first folded rectangle and the second folded rectangle intersect in the 3D virtual world.

22. A computer-implemented method comprising:
a computer system receiving a first list of points specified with respect to a given cartographic reference system, wherein the first list of points define a first polyline, wherein the first list of points includes two end points and at least one knee point;
the computer system receiving user input identifying a first sequence of images that have been previously stored in a memory;
the computer system generating a first set of geometry data based on the first polyline and a first user-specified vertical range, wherein the first set of geometry data represents a first folded rectangle in three-dimensional space, wherein the first folded rectangle has one fold for each knee point in the first polyline;
the computer system adding the first set of geometry data to a 3D virtual world;
the computer system repeatedly rendering at least the first set of geometry data to generate a second sequence of rendered images, wherein each of the repeated renderings applies a corresponding one of the images of the first sequence as texture to the first set of geometry data; and
the computer system displaying the second sequence of the rendered images using a display system, wherein said displaying the second sequence of rendered images achieves an animation of the first sequence of images on the first folded rectangle in the three-dimensional space;
the computer system receiving user input specifying a second plurality of points in the first window, wherein the second plurality of points define a second polyline, wherein the second plurality of points includes two end points and zero or more knee points;
the computer system receiving user input specifying a second vertical range in the vertical dimension;
the computer system receiving user input identifying a second image that is stored in the memory;
the computer system generating a second set of geometry data based on the second polyline and the second vertical range, wherein the second set of geometry data represents a second folded rectangle in the three-dimensional space, wherein the second folded rectangle has one fold for each knee point in the second polyline;
the computer system adding the second set of geometry data to the 3D virtual world;
the computer system adding a copy of the second image to the 3D virtual world, wherein said adding the second image copy includes specifying that the second image copy is to be applied as texture to the second set of geometry data;
the computer system rendering the 3D virtual world, after having added the second set of geometry data and the second image copy, in order to obtain a second rendered image; and
the computer system displaying the second rendered image in the second window using the display system, wherein the displayed second rendered image visually represents the first image as being painted onto the first folded rectangle and the second image as being painted onto the second folded rectangle in the three-dimensional space;
wherein the first polyline and the second polyline intersect in the first window, wherein the first folded rectangle and the second folded rectangle intersect in the 3D virtual world.

23. A computer system comprising:
one or more processors; and
a memory that stores program instructions, wherein the program instructions are executable by the one or more processors to:
receive user input identifying a first image that has been previously stored in the memory;
receive user input specifying a first polyline in a given cartographic reference system;
display the first polyline in a first window using a display system;
generate a first set of geometry data based on the first polyline and a user-specified vertical range, wherein the first set of geometry data represents a folded object in three-dimensional space, wherein the folded object has one fold for each knee point in the first polyline;
render a 3D virtual world to obtain a rendered image, wherein said rendering the 3D virtual world includes rendering the first set of geometry data using the first image as texture; and
display the rendered image in a second window using the display system, wherein the displayed rendered image visually represents the first image as being painted onto the folded object in the three-dimensional space;
receive user input specifying a second plurality of points in the first window, wherein the second plurality of points define a second polyline, wherein the second plurality of points includes two end points and zero or more knee points;
receive user input specifying a second vertical range in the vertical dimension;
receive user input identifying a second image that is stored in the memory;
generate a second set of geometry data based on the second polyline and the second vertical range, wherein the second set of geometry data represents a second folded rectangle in the three-dimensional space, wherein the second folded rectangle has one fold for each knee point in the second polyline;
add the second set of geometry data to the 3D virtual world;
add a copy of the second image to the 3D virtual world, wherein said adding the second image copy includes specifying that the second image copy is to be applied as texture to the second set of geometry data;
render the 3D virtual world, after having added the second set of geometry data and the second image copy, in order to obtain a second rendered image; and
display the second rendered image in the second window using the display system, wherein the displayed second rendered image visually represents the first image as being painted onto the first folded rectangle and the second image as being painted onto the second folded rectangle in the three-dimensional space;
wherein the first polyline and the second polyline intersect in the first window, wherein the first folded rectangle and the second folded rectangle intersect in the 3D virtual world.

* * * * *